United States Patent [19]

Gerhold et al.

[11] Patent Number: 5,108,729
[45] Date of Patent: Apr. 28, 1992

[54] PRODUCTION OF CARBIDE PRODUCTS

[75] Inventors: Bruce W. Gerhold; George F. Schuette, both of Bartlesville, Okla.; Kenneth E. Inkrott, Houston, Tex.

[73] Assignee: Phillips Petroleum Company, Bartlesville, Okla.

[21] Appl. No.: 416,078

[22] Filed: Oct. 2, 1989

[51] Int. Cl.⁵ .......................................... C01B 31/36
[52] U.S. Cl. .................................. 423/346; 423/345; 501/88
[58] Field of Search .................. 423/344, 345, 346; 422/194; 561/88

[56] References Cited

U.S. PATENT DOCUMENTS

| | | | |
|---|---|---|---|
| 2,614,946 | 10/1952 | Proudfoot | 117/100 |
| 2,632,713 | 3/1953 | Krejci | 106/307 |
| 3,025,192 | 3/1962 | Lowe | 148/33 |
| 3,085,863 | 4/1963 | Prener | 23/208 |
| 3,161,473 | 12/1964 | Pultz | 23/208 |
| 3,205,042 | 9/1965 | Jacobson | 23/208 |

(List continued on next page.)

FOREIGN PATENT DOCUMENTS

| | | | |
|---|---|---|---|
| 1214309 | 11/1986 | Canada . | |
| 0111008 | 6/1984 | European Pat. Off. . | |
| 2403296 | 9/1977 | France . | |
| 2591412 | 12/1985 | France . | |
| 0123813 | 8/1982 | Japan | 423/345 |
| 0194731 | 11/1983 | Japan | 423/345 |
| 59-47424 | 6/1984 | Japan . | |
| 8302108 | 6/1983 | World Int. Prop. O. | 423/345 |

OTHER PUBLICATIONS

Okabe et al., "Formation of Fine Silicon Carbide Powders by a Vapor Phase Method", Journal of Less Common Metals, 68 (1979), pp. 29-41.

Day, R. J., P. L. Walka and C. C. Wright, "The Carbon-Oxygen Reaction at High Temperature", in *Industrial Carbon and Graphite* (London, Society of Chemical Industry, 1958), p. 348.

Haslam, Robert T. and Robert P. Russell, *Fuels and Their Combustion*, N.Y., McGraw-Hill, 1926, pp. 318-322.

*North American Combustion Handbook*, 2nd ed., Cleveland, North American Mfg. Co., 1978, pp. 232-251.

*Kirk-Othmer Encyclopedia of Chemical Technology* (1980 ed.), vol. 11, pp. 821, 832-835.

Edwards, John B., *Combustion*, Ann Arbor, MI, Ann Arbor Science Publishers, Inc., 1974, pp. 7, 14, 149-151.

Walker, P. L., Jr., ed., *Chemistry and Physics of Carbon*, N.Y., Marcel Dekker, Inc., 1965, pp. 204-229.

PhilNews, Phillips Petroleum Company, vol. 12, No. 1 (1987), pp. 5 and 6.

*Ceramic Industry*, vol. 124, No. 1 (Jan. 1985), pp. 54 and 56.

Richerson, D. W., "What are Ceramics?" *Chemical Engineering*, vol. 20, No. 19 (Sep. 1982), pp. 123, 124, 126.

Primary Examiner—Olik Chaudhuri
Assistant Examiner—Ken Horton
Attorney, Agent, or Firm—William R. Sharp

[57] ABSTRACT

A method and apparatus are provided for producing a product comprising a carbide compound, such as for example silicon carbide. A reactor is provided which has a chamber defined therein which is divided into a combustion zone and a reaction zone. A combustible mixture is injected into the combustion zone and accordingly combusted to form hot combustion products. At least one reactant (i.e. silane) is injected at the boundary between the zones so as to be carried into the reaction zone by the combustion products and react to form raw product comprising the carbide compound. The raw product can be purified by subsequent processing to remove oxygen and convert by-products to the desired carbide compound. The product of the invention has a low level of impurities and is made up of submicron, highly uniform particles. This makes the product particularly useful for fabrication of sintered ceramic parts.

31 Claims, 8 Drawing Sheets

U.S. PATENT DOCUMENTS

| | | | |
|---|---|---|---|
| 3,253,886 | 5/1966 | Lamprey et al. | 23/134 |
| 3,275,722 | 9/1966 | Popper | 264/65 |
| 3,306,705 | 2/1967 | Leineweber et al. | 23/208 |
| 3,340,020 | 9/1967 | Neuenschwander et al. | 23/349 |
| 3,346,338 | 10/1967 | Latham | 23/208 |
| 3,368,871 | 2/1968 | O'Conner et al. | 23/208 |
| 3,399,980 | 9/1968 | Bourdeau | 23/345 |
| 3,485,591 | 12/1969 | Evans et al. | 23/208 |
| 3,839,542 | 10/1974 | Chase | 423/346 |
| 3,848,062 | 11/1974 | Steiger et al. | 423/440 |
| 3,877,876 | 4/1975 | Chang | 422/194 |
| 3,979,500 | 9/1976 | Sheppard et al. | 423/289 |
| 4,133,689 | 1/1979 | Stroke | 106/44 |
| 4,162,167 | 7/1979 | Enomoto et al. | 106/44 |
| 4,188,368 | 2/1980 | Wolf | 423/350 |
| 4,248,844 | 2/1981 | Ramsey, Jr. et al. | 423/345 |
| 4,283,375 | 8/1981 | Horne, Jr. et al. | 423/345 |
| 4,284,612 | 8/1981 | Horne, Jr. et al. | 423/345 |
| 4,341,749 | 7/1982 | Iya et al. | 423/349 |
| 4,342,837 | 8/1982 | Suzuki et al. | 501/90 |
| 4,364,974 | 12/1982 | Gert | 427/213 |
| 4,377,563 | 3/1983 | Seimiya | 423/345 |
| 4,419,336 | 12/1983 | Kuriakose | 423/345 |
| 4,435,476 | 3/1984 | Phillips et al. | 428/412 |
| 4,482,669 | 11/1984 | Dietmar et al. | 524/442 |
| 4,500,504 | 2/1985 | Yamamoto | 423/345 |
| 4,504,453 | 3/1985 | Tanaka et al. | 423/345 |
| 4,521,393 | 6/1985 | Saito et al. | 423/344 |
| 4,525,335 | 6/1985 | Tanaka et al. | 423/344 |
| 4,535,007 | 8/1985 | Cannady | 427/226 |
| 4,543,344 | 9/1985 | Cannady | 501/92 |
| 4,548,798 | 10/1985 | Rice | 423/263 |
| 4,571,331 | 2/1986 | Endou et al. | 423/345 |
| 4,591,492 | 5/1986 | Tanaka et al. | 423/345 |
| 4,604,273 | 8/1986 | Czupryna et al. | 423/344 |
| 4,622,007 | 11/1986 | Gitman | 432/13 |
| 4,640,830 | 2/1987 | Arakawa | 423/345 |
| 4,668,642 | 5/1987 | Bujaiski | 501/88 |
| 4,757,035 | 7/1988 | Baney et al. | 501/88 |
| 4,818,511 | 4/1989 | Nishi et al. | 423/345 |
| 4,865,817 | 9/1989 | Burgess et al. | 422/194 |
| 4,891,339 | 1/1990 | Calcote et al. | 423/346 |

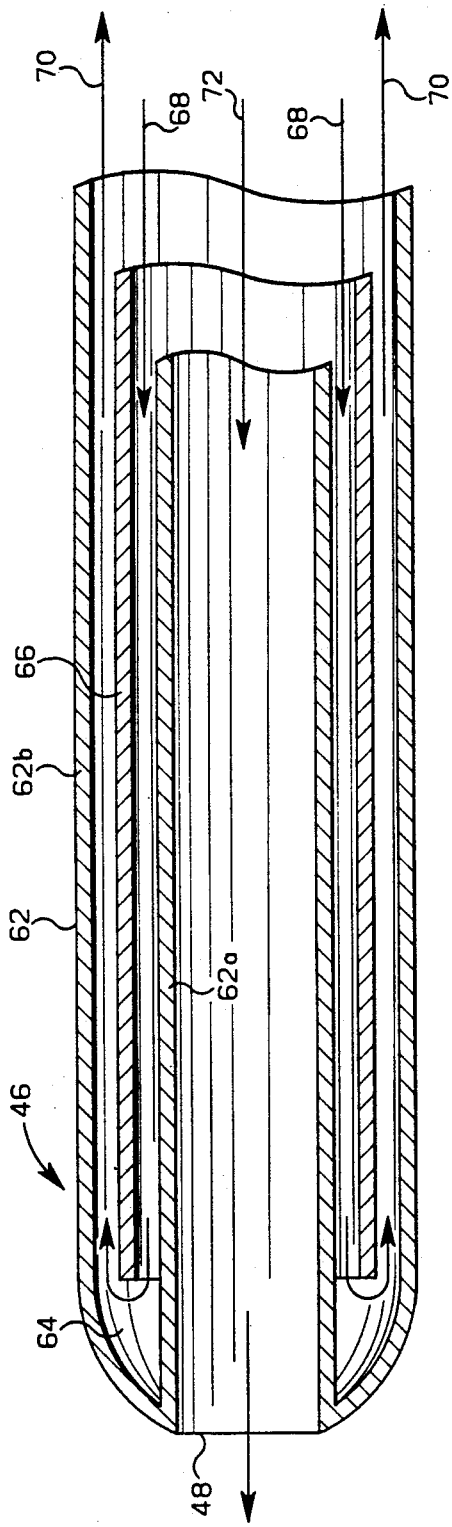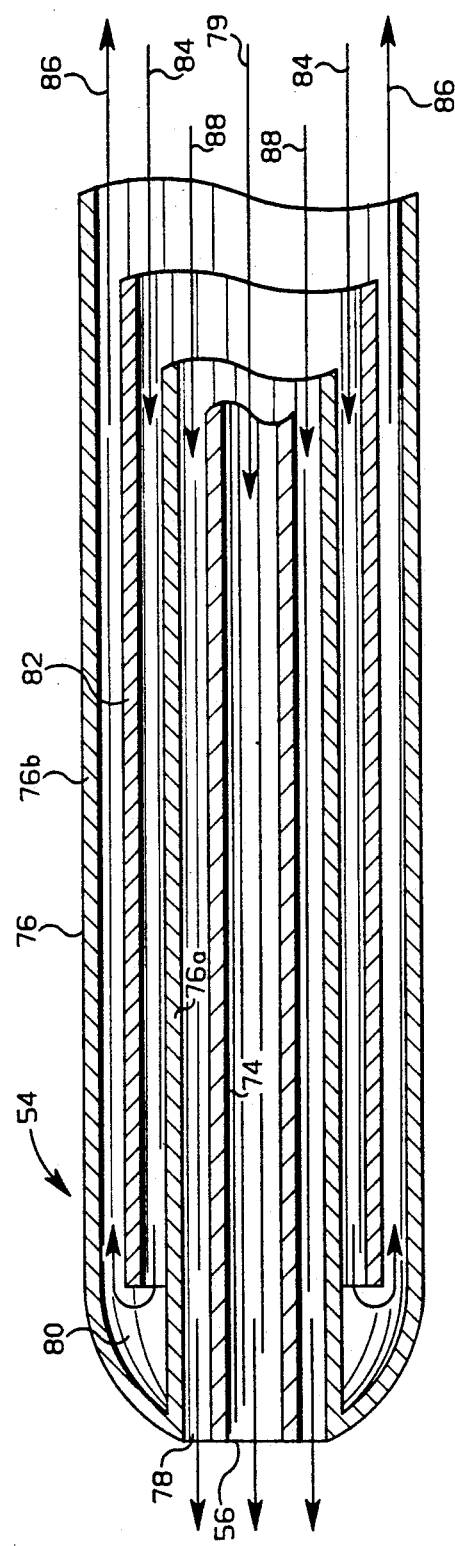

PRODUCTION OF CARBIDE PRODUCTS

BACKGROUND OF THE INVENTION

This invention relates to a method and apparatus for producing carbide products, such as silicon carbide. In another aspect, the invention relates to the composition of such carbide products.

Various carbide powders, such as silicon carbide, are useful as advanced ceramic materials in the fabrication of highly stressed, wear resistant ceramic parts, such as those employed in heat engines, turbo-charger rotors and heat exchangers. Powders which are used to make such parts must meet stringent particle size (i.e. submicron) and purity requirements. New synthesis methods currently being researched, involving plasma and laser heating of gaseous reactants, for example, are effective in producing submicron, high purity carbide powders, but employ expensive equipment with high energy demands. Thus, these methods may not be practical for economical, large scale synthesis. A more conventional method involves electrically heating a mixture of solid carbon and silicon dioxide. Large chunks of silicon carbide are produced which must be reduced in size by mechanical grinding. Such grinding adds undesirable metal impurities and requires a significant amount of additional energy.

SUMMARY OF THE INVENTION

It is, therefore, an object of the invention to provide a method and apparatus which are economical in producing a highly pure carbide product characterized by submicron particles.

The above object is realized in a method which comprises: providing a reactor having a chamber defined therein which has longitudinally separated upstream and downstream ends, wherein the chamber comprises a combustion zone and a reaction zone such that the combustion zone extends from the upstream end to a boundary between the zones and such that the reaction zone extends from the boundary to the downstream end; establishing a flow of a combustible mixture in the combustion zone so as to generally flow in a direction toward the reaction zone, wherein the combustible mixture comprises a mixture of a fuel and an oxidant; combusting the combustible mixture in the combustion zone to produce hot combustion products; injecting at the boundary between the zones at least one reactant such that the hot combustion products carry the reactant(s) toward said downstream end, wherein the temperature in at least a portion of the reaction zone is at least about 1400° C. and wherein the elemental molar ratio of carbon to oxygen for the combination of the combustible mixture and reactant(s) is at least about 0.8:1, wherein the reactant(s) is capable of reacting in the reaction zone to form a carbide compound; whereby a product powder comprising the carbide compound is produced in the reaction zone.

According to another aspect of the invention, an apparatus is provided which comprises: a reactor having a chamber defined therein which has an upstream end and a downstream end; a first nozzle which has an outlet end which communicates with the chamber at a position intermediate the upstream and downstream ends and which comprises first and second tubular members, wherein the first tubular member is generally coaxially positioned within the second tubular member such that a generally annular space is defined between the interior surface of the second tubular member and the exterior surface of the first tubular member; means for passing at least one reactant through the first tubular member so as to exit the first tubular member into the chamber, wherein the reactant(s) is capable of reacting in the reactor chamber to form a carbide product; means for passing a gas through the generally annular space so as to exit the first nozzle and generally surround the reactant(s) flowing from the outlet end of the first nozzle; a second nozzle having an outlet end which communicates with the chamber at a position closely adjacent to the upstream end; and means for passing a combustible mixture through the second nozzle so as to exit its outlet end into the chamber.

According to yet another aspect of the invention, there is provided a raw product as collected directly from the above-mentioned reactor (where a reactant includes a silicon component) which comprises silicon carbide and which is characterized by the following weight percentages: silicon in the amount of about 30 to about 75 weight percent; carbon in the amount of about 15 to about 50 weight percent; and oxygen in the amount of about 1 to about 30 weight percent. Such raw product having a relatively high oxygen content of about 3 weight percent to about 10 weight percent is sinterable to a ceramic part having a high density of about 2.8 g/cc. Purification of the raw product by subsequent processing produces an extremely pure silicon carbide product. The product in accordance with the invention is composed of submicron particles containing a very low level of impurities as will be discussed in more detail in the Detailed Description.

The method and apparatus of the invention are economical in requiring the use of inexpensive combustible fuels as the heating sources and in requiring a minimal investment for construction of the reactor. Therefore, the invention is particularly well suited to large scale synthesis of high quality carbide products.

BRIEF DESCRIPTION OF THE DRAWINGS

FIGS. 2 and 3 are enlarged cross-sectional views of nozzles which are shown in FIG. 1.

DETAILED DESCRIPTION OF THE INVENTION

A preferred embodiment of the invention will now be described with reference to the drawings.

Figure 1:
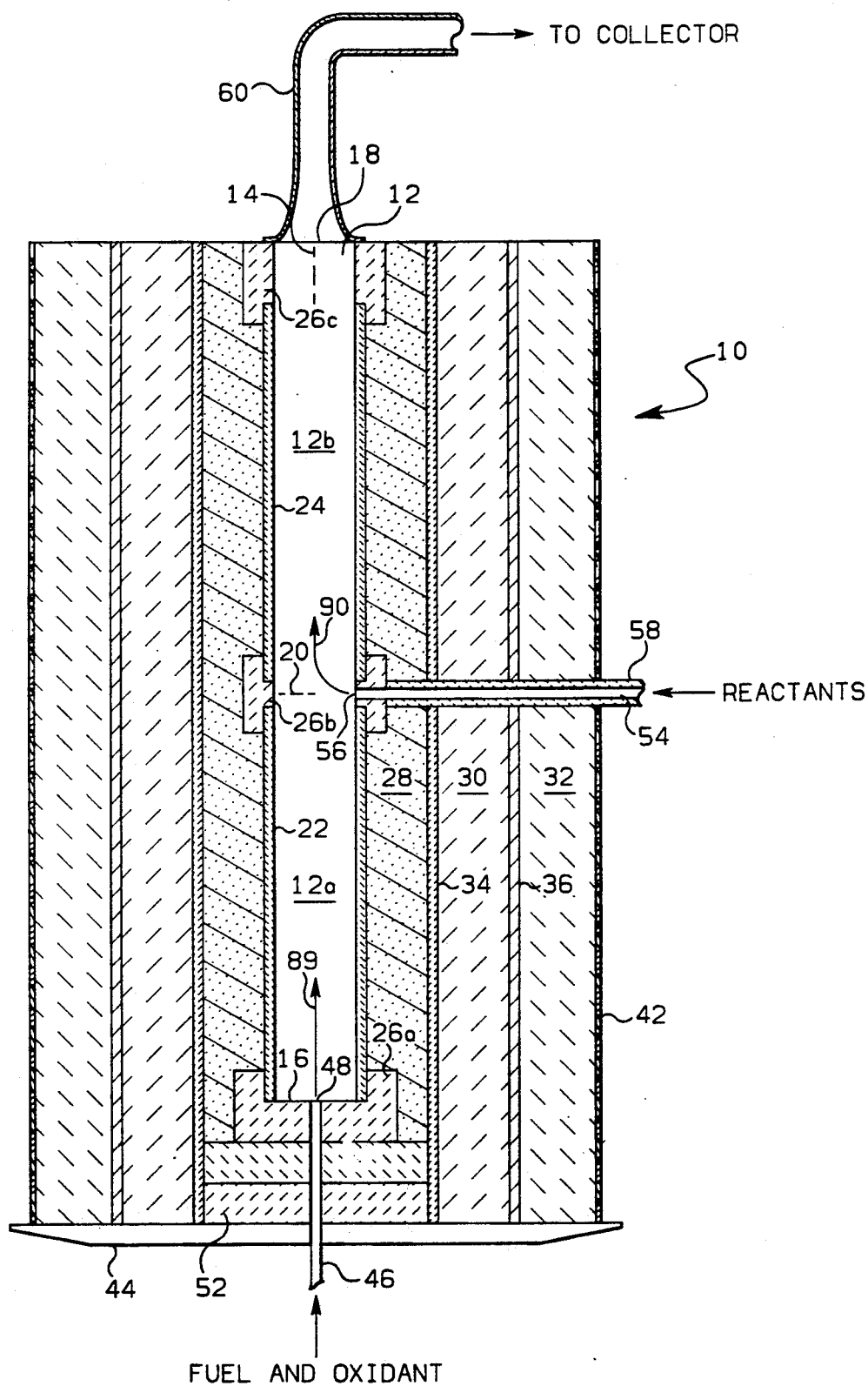
FIG. 1 is a cross-sectional view of a reactor in accordance with a preferred embodiment of the invention.

Referring to FIG. 1, there is shown a cross-sectional view of a reactor 10 having defined therein a chamber 12 which has a longitudinal axis 14 and longitudinally separated upstream and downstream ends 16 and 18, respectively. Chamber 12 includes a combustion zone 12a and a reaction zone 12b situated such that combustion zone 12a extends from upstream end 16 to an imaginary boundary 20 between the zones and such that the reaction zone 12b extends from boundary 20 to downstream end 18.

Chamber 12 is defined by refractory tubes 22 and 24 and also inserts 26a, b and c. Such tubes and inserts are preferably composed of a refractory material resistant to temperatures of at least 2000° C., such as zirconia, which is commercially available from Zircoa Products of Solon, Ohio.

As shown, there is provided several additional coaxially positioned layers of refractory material which are generally annular in shape and which surround tubes 22 and 24, including: layer 28, preferably comprising zirconia powder insulation, available from Zircar Products of Florida, N.Y., which allows for contraction and expansion of this layer; layer 30, which preferably comprises alumina-silica blanket insulation, commercially available under the trademark Fiberfrax ® from Carborundum of Niagara Falls, N.Y.; and layer 32, which may be of the same composition as layer 30. A refractory cyclinder 34, preferably low density thermal insulating alumina available from Zircar Products of Florida, N.Y., is illustrated as separating layers 28 and 30, and a metal cylinder 36 most preferably composed of stainless steel separates layers 30 and 32. Cylinders 34 and 36 assist in providing structural support for the reactor.

The outermost refractory layer 32 is held in place by a cloth material 42, such as fiberglass, which wraps around the exterior surface of layer 32. The bottom end of the various layers are supported by a metal plate 44. The reactor is preferably oriented vertically as shown for the sake of operating convenience. If any of the refractory material breaks or cracks it tends to stay in position if the various layers and tubes are vertically positioned. Therefore, operation can sometimes continue despite such structural defects. Other reactor orientations are within the scope of the invention.

Nozzle 46 is connected to a source of fuel and oxidant and has an outlet end 48 which communicates with the combustion zone 12a of chamber 12 at a position closely adjacent to upstream end 16 of chamber 12. As shown, nozzle 46 is surrounded by refractory inserts 52 positioned near upstream end 16. Nozzle 54 is connected to a source of reactants, discussed later in detail, and extends through the various refractory layers to an outlet end 56 which communicates with chamber 12 at boundary 20 intermediate upstream and downstream ends 16 and 18. Nozzle 54 is surrounded by a refractory tube 58.

Proper positioning of the nozzles with respect to each other is an important consideration in optimizing operating efficiency and quality of the product. It is desirable for example to position nozzle 54 far enough downstream so that substantially all of the free oxygen has reacted with the fuel to form combustion products. Such positioning of the nozzles means that there is substantially no free oxygen ($O_2$ in its free gaseous state, uncombined with any other component) at boundary 20, thus avoiding the undesirable oxidation of one of the reactants, as will be discussed further in connection with operation of the apparatus. It is furthermore desirable to position nozzle 54 sufficiently downstream from nozzle 46 to avoid the jet pump effect on gases flowing from nozzle 46. This effect tends to pull the reactants upstream rather than the intended downstream flow. However, in addition to the above considerations, nozzle 54 should be positioned sufficiently upstream to ensure that temperatures to which the reactants are exposed are conducive to the formation of carbide product.

Also shown in FIG. 1 is conduit 60 which is connected at one end to reactor 10 so as to communicate with the downstream end 18 of chamber 12. Conduit 60 receives carbide product powder therethrough which then passes to a suitable collector, discussed further below. Conduit 60 in the illustrated embodiment not only functions to transport the product to the collector, but also functions as a heat exchanger. The outside of conduit 60 is exposed to a cooling means such as ambient air which allows heat transfer via both natural convection and radiation. Such heat transfer effects cooling of the product powder as it flows through conduit 60, which is highly desirable in order to prevent undesirable reactions involving, for example, oxidation of the carbide product to form unwanted oxides. In addition, such cooling of the product powder is desirable to prevent damage to the collector from excessively hot product. In instances where a cloth filter bag is used as the collector, conduit 60 should be of sufficient length to cool the product powder to a desired temperature, typically below about 100° C., before it enters the collector. Other types of collectors require less cooling. If desired, the cooling effect can be further enhanced by surrounding conduit 60 with a cooling coil or jacket having coolant fluid flowing therethrough.

With respect to materials for conduit 60, it is preferable that a non-metallic material be employed which will not add any undesirable metal contaminants to the product. If the desired product is silicon carbide for example, quartz (silicon dioxide) is preferred since molecular structures characterized by silicon-oxygen bonds are already present in the reactor product such that essentially no additional contaminants will enter the product stream. Quartz is also a particularly preferred material because of its high emissivity and excellent thermal shock resistance. However, other heat exchange materials, including metals, are within the scope of certain aspects of the invention.

The collector can be any suitable means of collecting the product powder. One suitable collector, as discussed above, comprises a cloth filter bag connected to the downstream end of conduit 60. Other suitable collectors include metal filters, electrostatic precipitators and cyclone separators. Of course, regardless of what type of collector is used a pressure differential should preferably be established, by a suitable pump, across the collector to draw the product powder through conduit 60 and into the collector.

Referring to FIG. 2, there is shown a cross-sectional view of a portion of nozzle 46 having outlet end 48. Nozzle 46 comprises a tubular member 62, preferably constructed of a metal such as stainless steel, which has an inner sidewall 62a and an outer sidewall 62b. Such sidewalls define a generally annular space 64 therebetween which is connected to a source of coolant fluid such as water or ethylene glycol or a combination thereof, which could also include minor amounts of additives such as corrosion inhibitors, etc. if desired. A tubular member 66 is positioned within annular space 64 so as to generally divide the space into entrance and exit passageways for the coolant fluid. As shown, coolant fluid flows toward the tip of nozzle 46 as indicated at 68, and flows away from the tip in the opposite direction as indicated at 70. The direction of coolant fluid flow may be reversed if desired. The flow of coolant fluid through space 64 assists in preventing melting of the metallic tubular members, and also assists in preventing the flame from burning back (flashback) into nozzle 46 by keeping the interior of nozzle 46 below the autoignition temperature of the fuel/oxidant mixture. The interior of nozzle 46 is connected to a source of fuel and oxidant such that a flow of the fuel/oxidant mixture is established through nozzle 46 as indicated at 72.

Referring to FIG. 3, there is shown a cross-sectional view of nozzle 54 having outlet end 56. Nozzle 54 is preferably constructed of the same or similar metallic material as that used for nozzle 46, and includes tubular members 74 and 76. As shown, tubular member 74 is positioned generally coaxially within tubular member 76 such that a generally annular space 78 is defined between the interior surface of member 76 and the exterior surface of member 74. The interior of tubular member 74 is connected to a source of reactants to provide a flow of reactants therethrough as indicated at 79. Tubular member 76 is generally of the same design as member 62 in FIG. 2, and includes respective inner and outer sidewalls 76a and 76b between which there is defined a generally annular space 80. A tubular member 82 is positioned within annular space 80 so as to divide it into entrance and exit passageways. Space 80 is connected to a source of coolant fluid so as to establish respective entrance and exit flow paths 84 and 86. The reverse direction of coolant fluid flow can be employed if desired. The flow of coolant fluid not only assists in preventing melting of the metallic tubular members, but also helps prevent the formation of carbide deposits within nozzle 54 by maintaining the temperature of the nozzle below temperature limits conducive to carbide formation. This avoids the need to periodically clean carbide deposits from nozzle surfaces.

Annular space 78 is connected to a purge gas source to establish a flow of such purge gas through annular space 78 in the direction of outlet end 56, as indicated at 88. Thus, this flow of purge gas exits outlet end 56 in a generally annular stream so as to surround the reactants as they exit the nozzle. This annular gas stream forms a sheath around the reactants so as to prevent contact of the hot combustion gases in chamber 12 (see FIG. 1) with the reactants immediately after their exit from nozzle 54, thereby preventing the formation of carbide deposits on the tip of nozzle 54. Such deposits, if not prevented, can eventually lead to blockage of reactant flow from nozzle 54 and consequent reactor shutdown. Of course, the insulative sheath of purge gas disperses after only a few milliseconds, but this is sufficient time to allow the reactants to flow far enough away from the nozzle tip to prevent formation of undesirable deposits. The choice of purge gas is not critical, and can be, for example, an inert gas (i.e. helium or argon), a cooled waste gas as discharged from the reactor, or a reactive carbon-containing gas (i.e. hydrocarbon) which can contribute carbon to the reactive stream for formation of carbides. If a carbon-containing hydrocarbon is used as the purge gas, it typically will not decompose quickly enough to result is any undesirable carbon deposits on the tip of nozzle 54.

The various gas flows are preferably established and controlled by conventional equipment not shown in the drawings. Gas can be supplied by, for example, pressurized gas bottles. The gas can pass from such a pressurized container and through an orifice plate whose orifice is sized to achieve sonic velocity of the gas. Such a sonic velocity prevents pressure disturbances from traveling upstream, so that whatever happens downstream near the reactor will not affect the desired flow rate of gas. A pressure regulator can be employed to control the rate of flow of the gas.

Turning now to another aspect of the invention, there is provided a method of making a carbide compound using the above described apparatus. Reference will be made to the drawings in describing a preferred embodiment of this method.

As used herein and in the appended claims, a carbide compound is defined as a compound of a first elemental component and a second, carbon component. Generally speaking, a carbide compound is produced in accordance with the illustrated embodiment by reacting two reactants. The first reactant contains the first component whereas the second reactant contains the second, carbon component.

According to certain broad aspects of the invention, the first component as contained in the first reactant may be any element capable of combining with carbon to form a carbide compound. For example, the first component may be a metal such as tungsten, chromium, titanium, zirconium, molybdenum or iron. Halides of such metals are particularly suitable as the first reactant. Or, the first component may be a metalloid such as boron or silicon. As stated previously, silicon carbide is a very useful carbide compound. Ceramic parts can be made from silicon carbide powder which have excellent mechanical strength and heat resistance. Therefore, reactants having silicon as the first component are of particular interest in connection with the present invention.

Preferred silicon-containing reactants which are compounds of silicon include silane ($SiH_4$) and substituted silanes. As used herein and in the appended claims, a substituted silane can be generally expressed by the formula SiABCD where each of A, B, C and D can be any element or combination of elements as long as at least one of A, B, C and D is not hydrogen, and where A, B, C and D can be the same or different. For example, any one of A, B, C and D can be selected from hydrogen, a halogen, an oxygen-containing group (i.e. $OSi(CH_3)_3$), a nitrogen-containing group (i.e. $NHSi(CH_3)_3$), an alkyl group, an aryl group, a silyl group, or a group containing multiple silicon atoms. Examples of such substituted silanes include: alkyl silanes such as methylsilane (($CH_3)SiH_3$), dimethylsilane (($CH_3)_2SiH_2$), trimethylsilane (($CH_3)_3SiH$) and tetramethylsilane ($Si(CH_3)_4$); halogenated silanes such as dichlorosilane ($H_2SiCl_2$); halogenated methylsilanes such as trimethyl silicon bromide (($CH_3)_3SiBr$) and dichlorodimethylsilane (($CH_3)_2SiCl_2$); siloxanes such as hexamethyldisiloxane (($CH_3)_3SiOSi(CH_3)_3$); silazanes such as hexamethyldisilazane (($CH_3)_3SiNHSi(CH_3)_3$); and silicon halides such as silicon tetrachloride ($SiCl_4$). Cyclic and polymeric silicon compounds are also within the scope of the invention. If desired, mixtures of any of the preceding silicon-containing compounds can be employed. Silane is the presently preferred silicon-containing reactant in view of the quality of the product.

The second, carbon-containing reactant is preferably a $C_1-C_9$ carbon compound such as an alcohol or a hydrocarbon. Suitable alcohols include ethanol and propanol. A hydrocarbon is presently most preferred and can be selected, by way of example, from the following group: methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof. Although such $C_1$-$C_9$ carbon compounds are preferred, any carbon-containing reactant capable of reacting with the first reactant to form carbide products is within the scope of certain aspects of the invention.

The fuel, which is injected through nozzle 46, is preferably an unsaturated hydrocarbon (having at least one double or triple bond between carbon atoms), such as, for example, ethylene, propylene, butene, propadiene, butadiene, acetylene, propyne, butyne and mixtures thereof, and can be the same as or different than the hydrocarbon second reactant. Another preferred group of hydrocarbon fuels are cyclic hydrocarbons such as cyclopropane, cyclobutane, and mixtures thereof. Other types of fuels, such as solid fuels substantially comprising pure carbon, and fuel blends are within the scope of certain aspects of the invention as long as the desired temperature conditions and carbon to oxygen ratio, later discussed, are achieved in the reactor.

The oxidant employed should be capable of accepting electrons from the fuel and is preferably an oxygen-containing gas, most preferably pure oxygen. Gaseous mixtures which include oxygen as a single component, such as air, are within the scope of the invention.

In accordance with a preferred procedure for operating the illustrated apparatus, flow of coolant fluid is started with respect to nozzles 46 and 54, followed by gradual heating of the reactor to normal operating temperatures. This is done to avoid thermal shock and possible breakage to the various refractory materials. One method for this preheating stage involves initial electrical heating of the refractory layers with electrical rod heaters (not shown) and heating of chamber 12 with a coiled wire electrical heater (not shown) inserted into chamber 12, followed by establishment of a combustion flame in combustion zone 12a.

In any event, the combustion flame is established in combustion zone 12a by initiating a flow of gaseous fuel through nozzle 46. If the reactor has been preheated electrically, the fuel should spontaneously establish a flame by reacting with ambient air at downstream end 18 of chamber 12. If the combustion flame does not form, the fuel may be ignited with an appropriate ignition device. After the flame is established, a flow of air is initiated through nozzle 46 so as to produce a fuel/air mixture. This causes the flame to propagate upstream so that the flame establishes itself in combustion zone 12a. Propagation of the flame in this manner can be hazardous to an operator implementing the method such that adequate safety precautions are taken. The reactor is typically operated with this fuel/air mixture for a predetermined period, usually ½ hour to 1 hour. Operation of the reactor with air as the oxidant is part of the preliminary start-up of the reactor to gradually heat the reactor.

A flow of pure oxygen is now commenced through nozzle 46 to replace the air. The flow of such oxygen is gradually increased and the flow of air gradually decreased until a fuel/oxygen combustible mixture is obtained. The combustion flame should be monitored visually through downstream end 18 to make sure that the flame does not flash back upstream so as to enter the nozzle 46 and cause a potentially dangerous condition. Flashback can be prevented by providing a sufficiently high velocity of fuel and oxygen exiting nozzle 46.

A flow of the fuel/oxygen mixture is thus established in a direction generally parallel to axis 14 as indicated at 89, and the fuel and oxygen flow rates are set to be relatively fuel-rich in preparation for carbide production. The elemental molar ratio of carbon to oxygen for the fuel/oxygen mixture is preferably at least about 0.7:1, more preferably in the range of about 0.8:1 to about 1.2:1, and most preferably in the range of about 0.9:1 to about 1.1:1. As used herein, the elemental molar ratio of carbon to oxygen means the molar ratio of carbon atoms to oxygen atoms. The residence time of the combustible mixture and hot combustion products formed therefrom in combustion zone 12a is typically about 5 to about 20 milliseconds, which is sufficient time to consume substantially all of the oxygen before reaching boundary 20. As discussed previously, this is desirable to avoid the production of unwanted oxides rather than carbides. Temperature conditions in combustion zone 12a are typically about 1700° C. to about 2000° C.

The substantially gaseous reactants are now injected into chamber 12 at boundary 20, as indicated at 90, in a direction generally perpendicular to the chamber axis 14 such that the hot combustion products formed from combustion of the fuel carry the reactants toward downstream end 18. In the illustrated embodiment, the first and second reactants are premixed to give a desired molar ratio of silicon to carbon in the reactants of typically about 1:2 to about 1:4 and passed in admixture through nozzle 54 so as to exit outlet end 56 into chamber 12. If the first reactant employed is normally a liquid, such first reactant is placed in vapor form most conveniently by placing it in a temperature controlled bubbler and passing a purge gas therethrough. The temperature of the coolant fluid flowing through nozzle 54 can be elevated to the necessary extent to help prevent condensation of the first reactant as it passes through nozzle 54.

Flow rates are adjusted so that the elemental molar ratio of carbon to oxygen for the combination of the reactants and fuel/oxygen mixture is at least about 0.8:1, but is preferably in the range of about 0.9:1 to about 1.5:1 and most preferably in the range of about 1:1 to about 1.3:1. Although the reactions occurring in reaction zone 12b are numerous and not completely understood, it is believed that the above cited carbon to oxygen ratios minimize the production of undesirable oxidizing species such as carbon dioxide and water, and produce partial pressures of reducing gases like carbon monoxide and hydrogen which are favorable to the production of carbides. The preferred carbon to oxygen ratios for the fuel/oxygen mixture previously discussed (preferably at least about 0.7:1, more preferably about 0.8:1 to about 1.2:1, and most preferably about 0.9:1 to about 1.1:1) particularly enhance these conditions favorable to the production of carbides. In addition, reactor temperature is somewhat dependent on the carbon to oxygen ratio, and temperatures conducive to carbide formation are achievable using the above-discussed carbon to oxygen ratios.

If desired, it is within the scope of the invention to inject into chamber 12 in admixture with the reactants a boron-containing compound which will provide boron in the product collected from reaction zone 12b. Suitable boron-containing compounds include boranes, such as diborane ($B_2H_6$), other boron hydrides, and boron alkyls. As will be discussed in more detail in the examples, boron is a sintering aid.

Temperature conditions for at least a portion of reaction zone 12b are at least about 1400° C., preferably in the range of about 1400° C. to about 1700° C., most preferably in the range of about 1600° C. If temperatures at the upper end of theses ranges are desired, a preferred fuel is acetylene or a mixture of acetylene and ethylene. This is particularly desirable where the first reactant is, for example, a chlorinated silane such as dichlorodimethylsilane, which requires a higher temperature than some other reactants to achieve a desirable reaction rate to form silicon carbide and other products. The temperature conditions in the reactor can most conveniently be monitored by means of a thermocouple (not shown) positioned in one of the refractory layers. The temperature detected by the thermocouple can be correlated to actual temperature conditions in the reactor. Of course, a thermocouple can be positioned directly in the chamber 12, but this requires use of expensive materials such as platinum and/or rhodium which are still subject to deterioration due to the high temperatures in chamber 12.

Pressure conditions in reaction zone 12b are preferably at or near atmospheric pressure. Other operating pressures are within the scope of the invention.

In reaction zone 12b, a product powder is formed from the reactants which includes the desired carbide compound and other components as is discussed further below. The product powder exits the reactor through downstream end 18 and passes into and through conduit 60 to the collector. After the desired amount of product powder is collected, the reactor is shut down by first switching to air as the oxidant and then gradually decreasing the fuel/oxidant flow rates to provide gradual cooling of the reactor. It is sometimes desirable to run the reactor before shutdown for a period of time, i.e. 15 minutes, at full flow rates to burn out carbon deposits. After shutdown, the reactor is typically allowed to cool for several hours before the supply of coolant fluid to the nozzles is terminated.

In the following description of products produced in accordance with the invention and in claims appended hereto, it is to be understood that the term "weight percent" as applied to a component of a composition is based on the total weight of the composition.

The product powder as collected directly from the reactor, hereafter denoted as "raw" powder, is generally black in appearance, and in the case of silicon as the first elemental component, contains silicon carbide, silicon and carbon in addition to that in the silicon carbide, and oxygen. Such a raw product powder is characterized by the following weight percentages: silicon in the amount of about 30 to about 75 weight percent, preferably in the amount of about 50 to about 70 weight percent, and most preferably in the amount of about 55 weight percent to about 70 weight percent; carbon in the amount of about 15 to about 50 weight percent, preferably in the amount of about 20 to about 45 weight percent, and most preferably in the amount of about 30 to about 40 weight percent; and oxygen in the amount of about 1 to about 30 weight percent, preferably in the amount of about 1 to about 20 weight percent, and most preferably in the amount of about 1 to about 10 weight percent. Hydrogen can also be present in the raw product in minor but detectable amounts of between about 0 and about 1 weight percent. NMR analysis, as will be discussed further in a subsequent example, is also taken to indicate that at least some of the silicon atoms in raw product powder are bonded to both carbon and oxygen atoms. In other words, at least some of the silicon in the product is simultaneously bonded to both carbon and oxygen.

The raw product powder in accordance with the invention can be further characterized insofar as a sample of such powder having a relatively high oxygen content in the range of about 3 to about 10 weight percent is sinterable to a sintered ceramic part having a density of at least about 2.8 g/cc, or about 85% of the density of pure crystalline silicon carbide, by a process comprising: pressing the raw product at a temperature of less than about 100° C. to a pressed part having a density of no more than about 1 g/cc; heating the pressed part to a temperature of about 1700° C. to about 2400° C. without application of compaction force so as to produce the sintered part having the density of at least about 2.8 g/cc; wherein no steps are performed prior to the heating step for removal of any appreciable amounts of oxygen from the raw product or pressed part produced therefrom. As used herein and in the appended claims, the term "pressing" refers to any technique for fabricating a self-supporting shape from ceramic particles. Also as used herein and in the appended claims, the application of a "compaction force" to a ceramic part means the application of a force to the part by means of a solid member in contact with the part which mechanically compacts the part to thereby increase its density.

With respect to particle size, the raw product powder comprises particles having diameters in the range of about 0.01 to about 0.3 micron.

The raw product powder can be further purified by additional processing to yield a purified product. This purification process typically involves two stages carried out in a conventional furnace. First, the raw powder is heated in an inert gas (i.e. argon) atmosphere at a temperature of about 1300° C. to about 2400° C., most preferably about 1400° C. to about 1800° C., for at least about 15 minutes and most preferably in the range of about 1 hour to about 2 hours. This serves to react molecular structures having silicon-oxygen bonds with carbon to thereby remove oxygen as carbon monoxide and make the silicon available for reacting with free carbon to form additional silicon carbide. In certain instances, the raw powder will have insufficient carbon to remove a substantial portion of the oxygen, thus necessitating the addition of carbon to the raw powder before heating in the inert atmosphere. Second, the powder resulting from the first purification stage is heated in an oxygen-containing atmosphere to a temperature of about 600° C. to about 900° C., most preferably about 600° C. to about 700° C., over a period of at least about 15 minutes and most preferably for about 30 minutes to about 2 hours. This stage burns off remaining carbon in the form of carbon oxides to yield the purified product.

X-ray fluorescence analysis of the purified product indicates that the product has less than about 1000 ppm of elemental impurities, wherein such elemental impurities include aluminum and those elements of higher atomic numbers, except silicon, up to and including uranium. Most preferably, the product has less than about 600 ppm of such impurities. As discussed previously, many impurities undesirably decrease the strength of sintered carbide parts made from product powder.

Individual particles of the purified product in the form of a powder are highly uniform and have diameters which range from about 0.05 micron to about 0.5 micron. As discussed previously, submicron and uniform particles are vital characteristics in the production of fine-grained, high strength parts from a carbide powder. Crystallite size (size of individual crystals) range from about 30 to about 100 angstroms.

Either the raw or purified product can be sintered into heat resistant, high strength parts in a conventional manner. For example, appropriate amounts of additives such as boron and carbon or yttrium oxide and aluminum oxide can be added to such product, followed by pressing to a desired shape and heating at a temperature of about 1700° C. to about 2400° C.

It is to be understood that the above description pertains to a preferred embodiment of the invention, but that many variations and modifications are within the scope of certain aspects of the invention. For example, it is possible to use excess carbon from the fuel and/or the first reactant as the source of carbon for producing the carbide compound, in which case the second, carbon-containing reactant can be omitted. It is desirable in such an embodiment to utilize a carrier gas, such as nitrogen, helium, argon, hydrogen, carbon monoxide or mixtures thereof in admixture with the first reactant to carry the first reactant into the reactor chamber. Since a mixture of carbon monoxide and hydrogen is produced as a waste gas by the reactor, the reactor can serve as a convenient source of such carrier gas. Another possible variation could involve employing a fuel which includes a preferred unsaturated hydrocarbon as well as amounts of other types of hydrocarbons such as saturated hydrocarbons. However, this will generally decrease the heat produced by the combustion reaction so as to possibly require a supplemental heat source (i.e. electric, plasma, microwave, combustion zones exterior to chamber 12 but in heat exchange relationship with chamber 12, etc.) to obtain the desired temperature conditions in the reaction zone. In any event it is preferable that the hot combustion products as produced by combustion in the combustion zone provide at least about 15% of the energy needed to maintain desired temperature conditions of at least about 1400° C. in the reaction zone.

EXAMPLES

Specific examples will now be described to further illustrate the invention. These examples should not be construed to limit the invention in any manner.

In each of the following examples, various gaseous flow rates are given in gram moles/minute (abbreviated to gmol/min hereafter). Actual measurements of flow rate were taken volumetrically at room temperature and atmospheric pressure in units of liters/minute. These volumetric measurements were converted to gmol/min by assuming there are 24.45 liters/mole for any gas at 25° C. (room temperature) and at atmospheric pressure. All flow rates for gases below are undiluted with any other gases (i.e. carrier gases) unless specified otherwise.

With respect to elemental analysis results given in various tables, the carbon and hydrogen weight percentages were obtained by means of CHNS combustion analysis. The Si percentages were obtained in most cases using neutron activation analysis. In each example hereafter, silicon percentages shall be assumed to have been obtained using neutron activation unless indicated otherwise. In several examples, as will be indicated, X-ray fluorescence analysis was employed to determine silicon weight percentages. The oxygen percentages were obtained using only neutron activation. Weight percentage results which are provided in this regard are not normalized to 100% unless specified otherwise.

In several examples, the weight percentages obtained from elemental analysis sum to a total percentage of greater than 100% which might be considered an unreasonably high value. It was found in this regard that at least some of this error may have been contributed by the results of neutron activation analysis for silicon and oxygen. The neutron activation instrument was calibrated with an analytical standard sample of silicon dioxide (Puratronic grade, Johnson Matthey Chemical Ltd., Herts, England). The results of such analysis favorably compared to the actual weight percentages of silicon and oxygen in the standard sample. Therefore, every possible effort was made to produce accurate neutron activation analysis results for silicon and oxygen. After noting consistently high (i.e. greater than 100%) total weight percentage results in analyzing products of the invention, a series of samples were analyzed for silicon by both neutron activation and X-ray fluorescence. The neutron activation analysis always yielded a weight percentage of silicon slightly greater than that weight percentage obtained by X-ray fluorescence analysis of the same sample.

In each example where an elemental analysis was performed, CHNS analysis revealed detectable amounts of hydrogen. However, hydrogen weight percentages of less than 1 weight percent are not reported in the following examples.

With respect to terminology and notations used hereafter, it will be understood that all degree readings obtained by X-ray diffraction are for an angle of $2\theta$. In addition, the notation Si—O means silicon bonded to oxygen but denotes no particular molecular structure.

EXAMPLE I

The purpose of this example, at least in part, is to show the formation of silicon carbide over a range of temperatures and carbon to oxygen ratios.

The apparatus used in this example was substantially similar to the apparatus shown in FIG. 1. However, the nozzle used for sidestream injection of reactants was similar in structure to the nozzle shown in FIG. 2 and was not adapted to receive a purge gas therethrough. A flow of water was employed in conjunction with each nozzle to serve as a coolant fluid. A relatively planar Teflon ® filter was used to collect a sample of powder exiting from the reactor. In operation, a differential pressure was established across the filter so that powder collected on one side of the filter to form a filter cake. Important dimensions for this apparatus are given in Table IA.

TABLE IA

| Item | Dimension |
|---|---|
| Diameter of chamber 12 | 2.54 cm |
| Overall length of chamber 12 | 44.4 cm |
| Length of combustion zone 12a | 12.0 cm |
| Length of reaction zone 12b | 32.4 cm |
| Overall diameter of reactor 10 | 22.0 cm |
| I.D. of fuel nozzle | 0.26 cm |
| I.D. of reactant nozzle | 0.22 cm |

Using the above described apparatus, five runs were made using ethylene ($C_2H_4$) as the fuel, pure oxygen as the oxidant, tetramethylsilane (Si(CH$_3$)$_4$) as the first, silicon-containing reactant, and ethylene as the second, carbon-containing reactant. In each run, the oxygen flow rate was 0.61 gmol/min, and powder was collected for a period of three minutes.

Reaction zone temperature for each run was measured at a location along the reactor chamber axis and 20 cm upstream from the downstream end of the chamber. A thermocouple comprising bare wires of different compositions was employed to measure these temperatures. The wires was made up of Type B alloys; that is, 94% platinum and 6% rhodium for one wire, and 70% platinum and 30% rhodium for the other wire. The two wires were run through a two hole electrical insulator made of 99.8% alumina, and the insulator and wires were encased in a 0.64 cm O.D. closed end 99.8% alumina tube to protect the wires from attack by the silicon reactant. A thermocouple junction was formed by extending the wires about 0.5 cm beyond the alumina tube and spot welding the wires together. This junction was located on the longitudinal axis of the reactor chamber. Since the reactor walls are insulated and hence operate close to the same temperature as the gases in the chamber, the thermocouple readings were not corrected for radiation error.

Table IB summarizes the various operating conditions for the five runs. The following parameters are set forth for each run: flow rates for the ethylene injected as a fuel with the oxygen, the ethylene reactant injected at the boundary between the combustion and reaction zones, and the tetramethylsilane gas reactant; the elemental molar ratio of carbon to oxygen for the combustible mixture only (combustion C:O ratio); the elemental molar ratio of carbon to oxygen for the combination of the combustion mixture and reactants which are injected into the chamber (overall C:O ratio); and the measured reaction zone temperature for each run.

lowest reaction zone temperature but highest C:O ratios, is very similar to pattern 1X. In contrast, patterns 2X, 3X and 4X have more prominent silicon carbide peaks, as shown for example at 92 for pattern 3X. Patterns 2X, 3X and 4X correspond to those samples produced with intermediate temperatures and C:O ratios.

Figure 5:
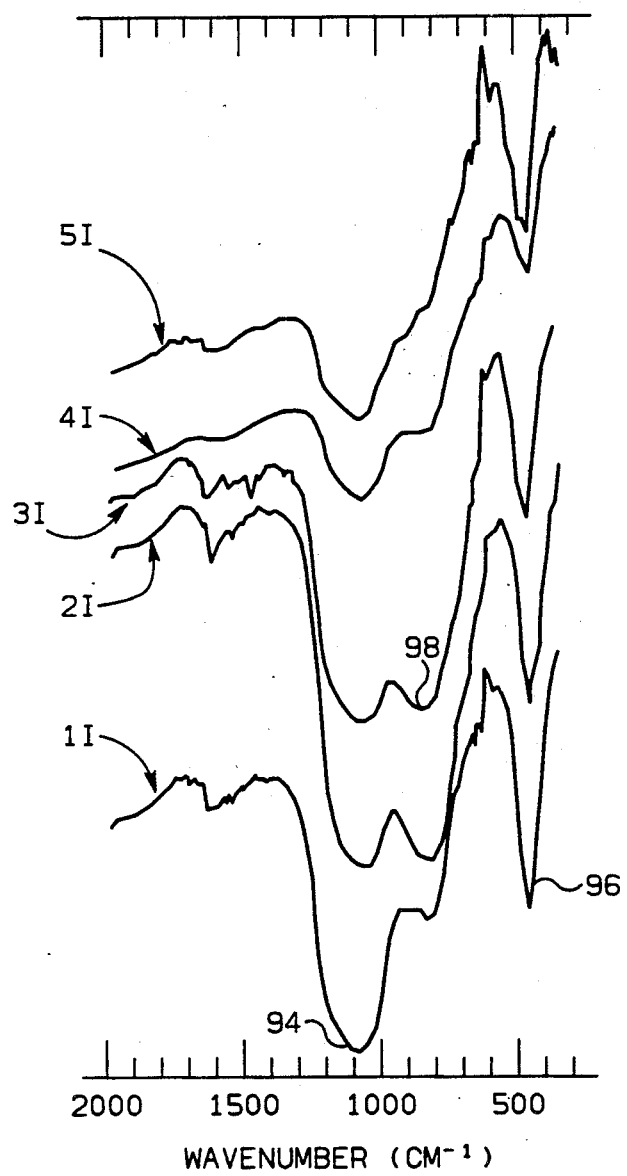
FIG. 5 shows infrared spectral patterns for the samples produced in Example I.

Samples 1-5 were also subjected to infrared analysis. Referring now to FIG. 5, there are shown infrared spectral patterns produced by transmittance analysis of each of the samples. Patterns 1I, 2I, 3I, 4I and 5I correspond to samples 1, 2, 3, 4 and 5 respectively. Pattern 1I has very prominent silicon-oxygen bond absorptions at a wavenumber (cm$^{-1}$) of about 1100 and between wavenumbers 400 and 500, as indicated by reference characters 94 and 96. Pattern 5I is similar but with slightly less prominent silicon-oxygen bond absorptions. Patterns 2I, 3I and 4I can be seen to have more prominent silicon carbide absorptions at a wavenumber of between 800 and 900 as is shown, for example, at reference character 98 for pattern 3I.

EXAMPLE II

The purpose of this example is to show the formation of silicon carbide using silane (SiH$_4$) as the silicon-containing reactant, ethylene (C$_2$H$_4$) as the hydrocarbon reactant and two different fuels. Two runs used an ethylene fuel and the remaining two runs used an ethylene/acetylene (C$_2$H$_4$/C$_2$H$_2$) mixture as the fuel. The ethylene/acetylene mixture was a 67%/33% mixture where the percentages indicated are volume percentages. Each of the four runs were carried out employing the apparatus described in Example I. Table IIA summarizes operating conditions for each of the runs and also data on the products collected. Pure oxygen was employed as the oxidant at a flow rate of 0.61 gmol/min.

TABLE IIA

| Run No. | C$_2$H$_4$ Fuel (gmol/min) | C$_2$H$_4$ + C$_2$H$_2$ Fuel (gmol/min) | C$_2$H$_4$ Reactant (gmol/min) | SiH$_4$ (gmol/min) | Combustion C:O Ratio | Overall C:O Ratio | Run Time (mins.) | Product (g) |
|---|---|---|---|---|---|---|---|---|
| 6 | 0.56 | — | 0.052 | 0.026 | 0.92 | 1.00 | 4 | 1.4 |
| 7 | 0.59 | — | 0.055 | 0.027 | 0.97 | 1.06 | 4 | 1.2 |
| 8 | — | 0.59 | 0.056 | 0.027 | 0.97 | 1.06 | 3 | 1.4 |
| 9 | — | 0.62 | 0.060 | 0.026 | 1.03 | 1.11 | ND* | 1.6 |

*ND means no data recorded.

Runs 7 and 9 both produced products visually characterized as blue-gray flakes, while run 6 produced gray flakes and run 8 produced gray particles.

The results of product analysis corresponding to each run are set forth in Table II B.

TABLE IB

| Run No. | C$_2$H$_4$ Fuel (gmol/min) | C$_2$H$_4$ Reactant (gmol/min) | Si(CH$_3$)$_4$ (gmol/min) | Combustion C:O Ratio | Overall C:O Ratio | Temp. (°C.) |
|---|---|---|---|---|---|---|
| 1 | 0.47 | 0.044 | 0.025 | 0.77 | 0.93 | 1587 |
| 2 | 0.52 | 0.048 | 0.027 | 0.85 | 1.02 | 1547 |
| 3 | 0.56 | 0.052 | 0.029 | 0.92 | 1.10 | 1509 |
| 4 | 0.62 | 0.058 | 0.032 | 1.02 | 1.22 | 1492 |
| 5 | 0.67 | 0.062 | 0.034 | 1.10 | 1.31 | 1490 |

For each run, a small sample (between 0.1 and 0.2 grams) was taken from the collected powder. Each sample, hereafter designated as samples 1-5 corresponding to runs 1-5 respectively, was subjected to both powder X-ray diffraction analysis and infrared analysis.

Figure 4:
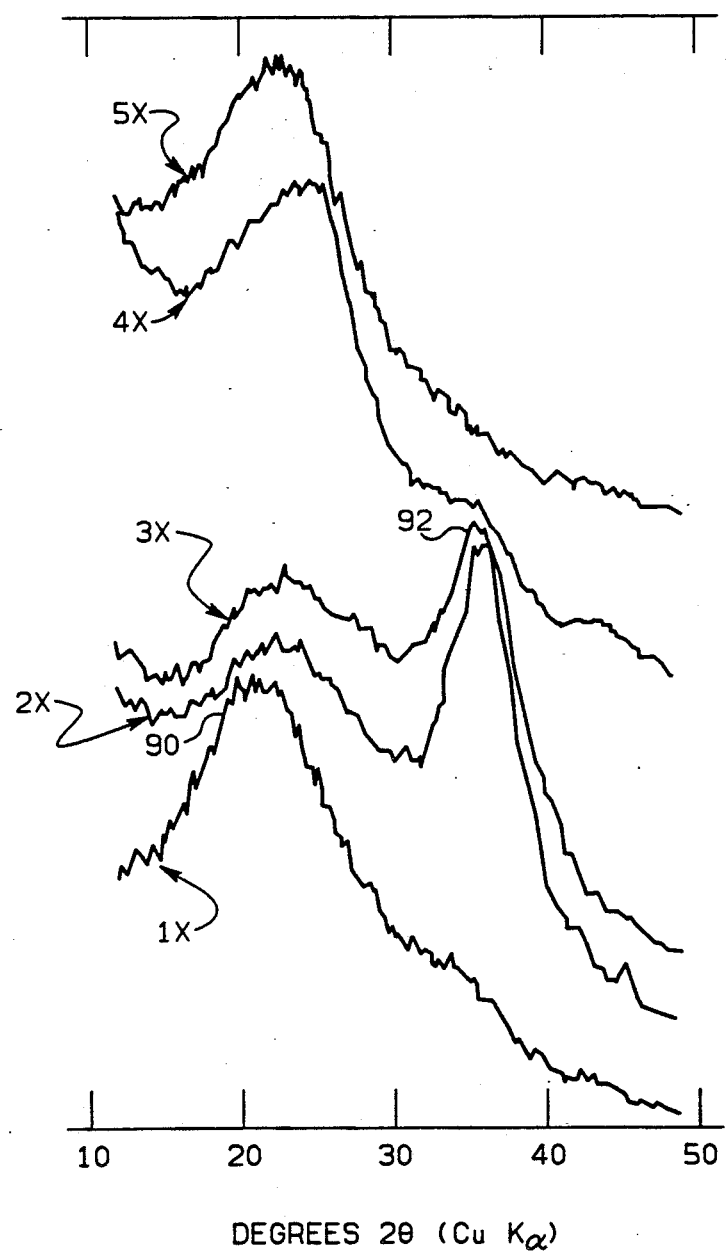
FIG. 4 shows X-ray diffraction patterns for samples produced in Example I.

The resulting powder X-ray diffraction patterns for each of samples 1, 2, 3, 4 and 5 are shown in FIG. 4 at reference characters IX, 2X, 3X, 4X and 5X respectively. Silicon carbide peaks are at 35.6° and C/Si—O peaks are between 15° and 30°. Pattern IX, corresponding to the highest reaction zone temperature but the lowest C:O ratios, has a very prominent C/Si—O peak as indicated at 90. Pattern 5X, corresponding to the

TABLE II B

| Run | C (wt. %) | Si (wt. %) | O (wt. %) |
|---|---|---|---|
| 6 | 22.8 | 61.6 | 22.3 |
| 7 | 22.3 | 60.9 | 24.3 |
| 8 | 31.0 | 57.5 | 15.6 |
| 9 | 36.6 | 58.0 | 9.9 |

Figure 6:
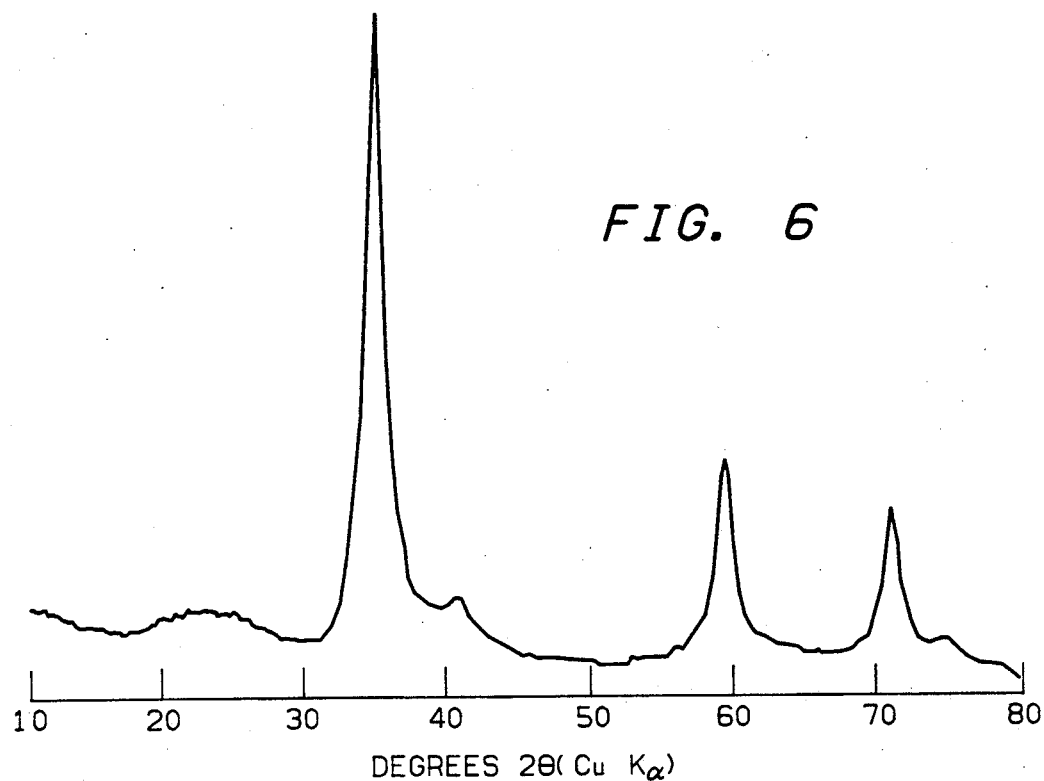
FIG. 6 is an X-ray diffraction pattern for a sample produced in Example II using silane as the silicon-containing reactant.
Figure 7:
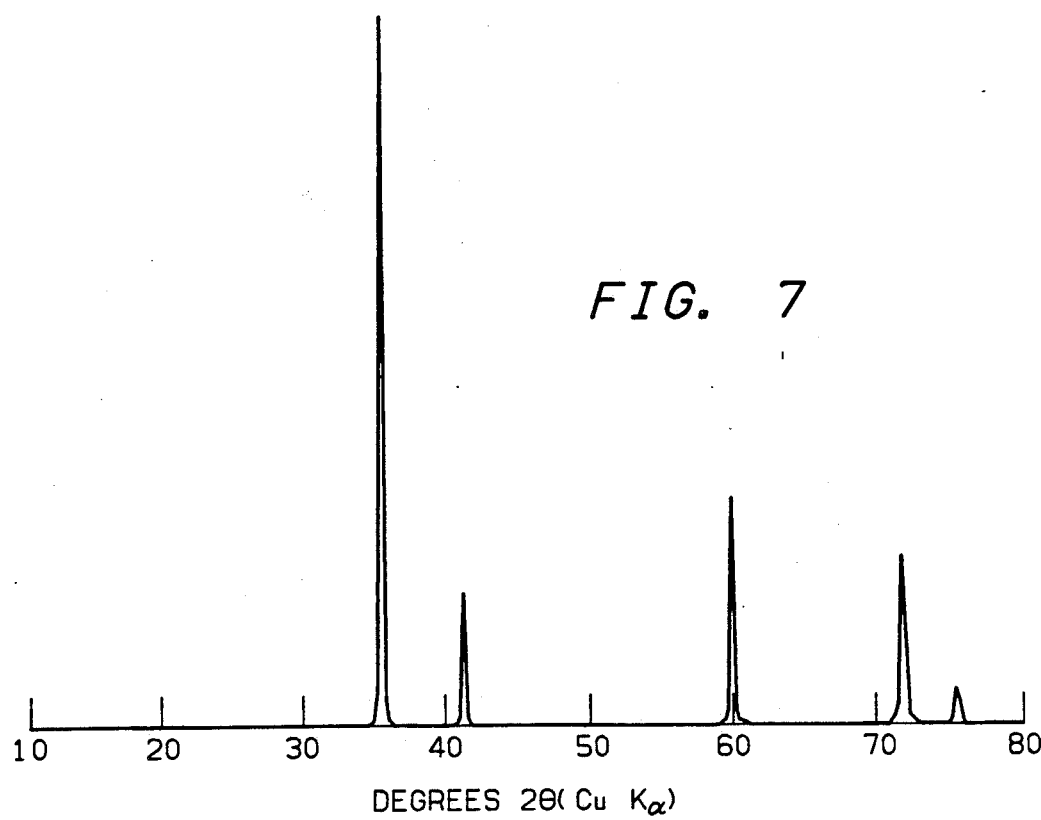
FIG. 7 is a reference X-ray diffraction pattern produced by a pure sample of crystalline $\beta$-silicon carbide.

The X-ray powder diffraction pattern of representative raw reactor product is presented in FIG. 6 produced under the conditions of run 9. By comparison to the reference x-ray powder diffraction pattern of beta crystalline silicon carbide in FIG. 7, it can be seen that the agreement between the reference diffraction pattern and the pattern of the product synthesized confirms that the product contains beta crystalline silicon carbide. However, the existence of beta crystalline silicon carbide in the raw product does not preclude the presence of alpha phase and/or amorphous silicon carbide.

EXAMPLE III

The purpose of this example is to show the formation of silicon carbide-containing products using sources of silicon other than silane and tetramethylsilane. These runs utilized ethylene/acetylene mixtures (67 vol. %/33 vol. %) as the fuel and either dichlorodimethylsilane ($SiCl_2(CH_3)_2$) or hexamethyldisilazane (($CH_3)_3SiNH-Si(CH_3)_3$) as the silicon-containing reactants. The reactor used in the experiments of this example was the reactor described in Example I. The run conditions and product characterizations for runs using dichlorodimethylsilane are presented in Table IIIA and those for hexamethyldisilazane are presented in Table IIIB. The oxygen flow rate in each run of Tables IIIA and IIIB was 0.61 gmol/min.

most intense peak for beta silicon carbide while the response at the higher angles results from the combination of two strong beta silicon carbide peaks at approximately 60° and 72°.

EXAMPLE IV

The purpose of this example is to demonstrate the production of silicon carbide products using tetramethylsilane (TMS) as the silicon-containing reactant and an ethylene/acetylene mixture (67 vol. % $C_2H_4$, 33 vol. % $C_2H_2$) as the fuel instead of just ethylene as in Example I. Equipment utilized in this demonstration was the same as for Example I. The oxygen flow rate in each run was 0.61 gmol/min. Table IV presents other process conditions and results of product analysis.

TABLE IV

TMS and Ethylene/Acetylene Fuel Mixture in Silicon Carbide Synthesis

| Run | Combustion C:O Ratio | Overall C:O Ratio | $C_2H_4 + C_2H_2$ Fuel gmol/min | TMS $Si(CH_3)_4$ gmol/min | $C_2H_4$ Reactant gmol/min | Product Analysis Wt. % Composition | | |
|---|---|---|---|---|---|---|---|---|
| | | | | | | C | Si | O |
| 13 | 0.97 | 1.17 | 0.59 | 0.033 | 0.056 | 38.1 | 60.8 | 1.7 |
| 14 | 1.02 | 1.23 | 0.62 | 0.035 | 0.060 | 38.0 | 63.1 | 1.2 |

X-ray powder diffraction patterns for the products from runs 13 and 14 each reveal a strong, sharp peak at about 35° and weaker but still well defined peaks at about 60° and 72°, thus indicating silicon carbide. With respect to C/Si—O, each pattern reveals a broad peak between 15° and 30° which is much weaker than either of the 60° and 72° silicon carbide peaks.

EXAMPLE V

The purpose of this example is to demonstrate that sidestream compositions that are incomplete with respect to the necessary carbon to form the desired silicon

TABLE IIIA

Silicon Carbide Synthesized from Dichlorodimethylsilane

| Run | Combustion C:O Ratio | Overall C:O Ratio | $C_2H_4 + C_2H_2$ Fuel gmol/min | $SiCl_2(CH_3)_2$ gmol/min | $C_2H_4$ Reactant gmol/min | Product Analysis Wt. % Compst. | | | |
|---|---|---|---|---|---|---|---|---|---|
| | | | | | | C | H | Si | O |
| 10 | 0.97 | 1.08 | 0.59 | 0.012 | 0.056 | 26.8 | 1.1 | 47.7 | 25.6 |
| 11 | 1.02 | 1.14 | 0.62 | 0.016 | 0.060 | 27.6 | 1.1 | 56.2 | 15.0 |

TABLE IIIB

Silicon Carbide Synthesized from Hexamethyldisilazane

| Run | Combustion C:O Ratio | Overall C:O Ratio | $C_2H_4 + C_2H_2$ Fuel gmol/min | $(CH_3)_3SiNHSi(CH_3)_3$ gmol/min | $C_2H_4$ Reactant gmol/min | Product Analysis wt. % Compst. |
|---|---|---|---|---|---|---|
| 12 | 0.97 | 1.16 | 0.59 | 0.019 | 0.056 | none performed |

With respect to product produced by run 10 with dichlorodimethylsilane, an X-ray powder diffraction pattern of such product has a fairly prominent C/Si—O peak between 15° and 30°, a strong silicon carbide peak at 35° and less prominent silicon carbide peaks at 60° and 72°. An X-ray powder diffraction pattern for run 11 shows similar silicon carbide peaks but a C/Si—O peak far less promiment than for the run 10 product.

An X-ray powder diffraction pattern was additionally obtained for the product resulting from run 12 using hexamethyldisilazane. A broad peak centered at 35° and a broad peak between 60° and 70° indicate the presence of beta silicon carbide. The 35° peak is the carbide compound may be utilized by relying on carbon from the fuel and/or silicon-containing reactant to supply the carbon component. This example also shows the formation of silicon carbide using low overall C/O ratios well below 1.0. Thus, as has been explained previously, the sidestream composition may include only a silicon-containing reactant and one or more of various carrier gases.

Table VA sets forth process conditions for runs in which hydrogen and helium were used as the carrier gas. The oxygen flow rate in each run was 0.61 gmol/min. The apparatus of Example I was used to carry out these runs.

TABLE VA

| | Carrier Gas Sidestream Synthesis of Silicon Carbide | | | | | |
|---|---|---|---|---|---|---|
| Run | Combustion C:O Ratio | Overall C:O Ratio | $C_2H_4$ Fuel gmol/min | Carrier Gas gmol/min | Carrier Gas composition | $Si(CH_3)_4$ gmol/min |
| 15 | 0.85 | 0.94 | 0.52 | 0.048 | $H_2$ | 0.027 |
| 16 | 0.92 | 1.02 | 0.56 | 0.052 | $H_2$ | 0.029 |
| 17 | 0.85 | 0.94 | 0.52 | 0.048 | He | 0.027 |
| 18 | 0.92 | 1.02 | 0.56 | 0.052 | He | 0.029 |

X-ray powder diffraction analysis was performed on the product resulting from each of runs 15-18. Each pattern revealed a prominent peak at about 35 degrees, thus indicating the presence of silicon carbide.

Several additional runs, 19-22, were made with hydrogen and nitrogen as carrier gases, but using a different and larger reactor than that reactor used for the runs in Table VA. The reactor used for runs 19-22 was substantially similar to that used in Example I, but included two sidestream reactant nozzles adapted to receive a flow of purge gas therethrough. The reactant nozzles were located on opposite sides of the reactor chamber, and each such nozzle was substantially similar to nozzle 54 shown in FIG. 3. A Dacron ® bag filter was utilized to collect product powder exiting from a quartz conduit having one end in communication with the downstream end of the reactor. Important dimensions of the reactor are given in Table VB, including dimensions of tubular members 74 and 76 of nozzle 54.

TABLE VB

| Item | Dimension |
|---|---|
| Diameter of Chamber 12 | 5.08 cm |
| Overall length of Chamber 12 | 53.3 cm |
| Length of Combustion Zone 12a | 27.9 cm |
| Length of Reaction Zone 12b | 25.4 cm |
| Overall O.D. of Reactor 10 | 33.0 cm |
| O.D. of Tubular Member 76 | 0.952 cm |
| I.D. of Tubular Member 76 | 0.394 cm |
| O.D. of Tubular Member 74 | 0.317 cm |
| I.D. of Tubular Member 74 | 0.175 cm |

The structure of the fuel nozzle was similar to that shown in FIG. 2, wherein this nozzle is denoted as nozzle 46. Dimensions of nozzle 46 are identical to those of nozzle 54, except with respect to tubular member 74. Of course, nozzle 46 does not have such an inner tubular member.

Table VC sets forth process conditions and product analysis for runs 19-22. In each of these runs, water was injected as a coolant fluid into and through annular spaces 64 and 80 defined within respective nozzles 46 and 54 (see FIGS. 2 and 3). In runs 19-21, no purge gas was injected into the sidestream reactant nozzles. However, in run 22, helium was utilized as a purge gas in each such nozzle so as to flow through annular space 78 of nozzle 54 at a flow rate of 0.15 gmol/min per nozzle. The oxygen flow in each of the runs was 1.09 gmol/min. Ethylene and acetylene were used as the fuel, and two different silicon-containing reactants (abbreviated as Rct. in Table VC) were employed. The flow rates indicated for the silicon reactant and carrier gas are total flow rates from both sidestream reactant nozzles into the chamber. Flow rates given in subsequent examples for gases other than purge gas flowing through opposing sidestream reactant nozzles will similarly be understood to be total flow rate from both such nozzles.

TABLE VC

| | Carrier Gas Sidestream Synthesis of Silicon Carbide | | | | | | | | Product Analysis Wt. % Composition | | |
|---|---|---|---|---|---|---|---|---|---|---|---|
| Run | Combustion C:O Ratio | Overall C:O Ratio | $C_2H_4$ gmol/min | $C_2H_2$ gmol/min | Carrier Gas gmol/min | Carrier Gas Compostn. | Silicon Rct. gmol/min | Silicon Rct. Compostn. | C | Si | O |
| 19 | 0.83 | 0.94 | 0.72 | 0.180 | 0.124 | $H_2$ | 0.0634 | $Si(CH_3)_4$ | none performed | | |
| 20 | 0.79 | 0.91 | 0.69 | 0.172 | 0.124 | $H_2$ | 0.0634 | $Si(CH_3)_4$ | none performed | | |
| 21 | 0.77 | 0.89 | 0.67 | 0.168 | 0.124 | $H_2$ | 0.0634 | $Si(CH_3)_4$ | none performed | | |
| 22 | 1.04 | 1.04 | 0.84 | 0.280 | 0.077 | $N_2$ | 0.0600 | $SiH_4$ | 19.0 | 65.8 | 16.8 |

Powder X-ray diffraction patterns obtained for products resulting from runs 19-21 have prominent, broad peaks between 15° and 30° indicative of carbon and silicon-oxygen bonds. Each pattern can be interpreted to have a shoulder on the C/Si—O peak at about 35°. The patterns, however, do not strongly indicate the presence of crystalline silicon carbide. It should be noted that X-ray diffraction analysis is sensitive only to crystalline materials so that the X-ray diffraction patterns corresponding to runs 19-21 do not necessarily rule out the presence of amorphous or poorly crystallized silicon carbide. Infrared analysis was also performed on the products of runs 19-21. Each resulting spectral pattern shows a clearly defined absorption at a wavenumber ($cm^{-1}$) between about 800 and 900, which indicates the presence of silicon carbide. Prominent absorptions are also located at wavenumbers of about 1100 and 450. These absorptions indicate the presence of silicon-oxygen bonds.

In view of the above data, it can be concluded that the products obtained from runs 19-21 contain silicon carbide which is poorly crystallized if not amorphous.

As to the product from run 22, an X-ray powder diffraction pattern revealed sharp, very prominent peaks at about 35°, 60° and 72°, indicating the presence of beta silicon carbide, and also peaks at about 28°, 47° and 56°, indicating the presence of elemental silicon. The pattern reveals little C/Si—O.

EXAMPLE VI

The purpose of this example is to demonstrate a representative particle size distribution obtainable from products produced by the invention. This example also demonstrates the production of a silicon carbide product using acetylene as the carbon-containing reactant and also using a mixture of silicon-containing reactants.

A reactor as described in Example V was utilized to produce the product of this example. For the instant example, the oxygen flow rate was 1.09 gmol/min. No purge gas was employed. The fuel was a mixture of ethylene and acetylene flowing at rates of 0.84 gmol/min and 0.28 gmol/min respectively. The combustion carbon to oxygen ratio was 1.03. The ceramic forming reactants were acetylene at 0.099 gmol/min, silane at 0.059 gmol/min, and tetramethylsilane at 0.058 gmol/min. This procedure resulted in a fine black product powder containing 42.8 wt. % carbon, 48.9 wt. % silicon, and 3.7 wt. % oxygen. An X-ray powder diffraction pattern shows prominent, well defined peaks at about 35°, 60° and 72°, thus indicating the presence of beta silicon carbide.

Figure 8:
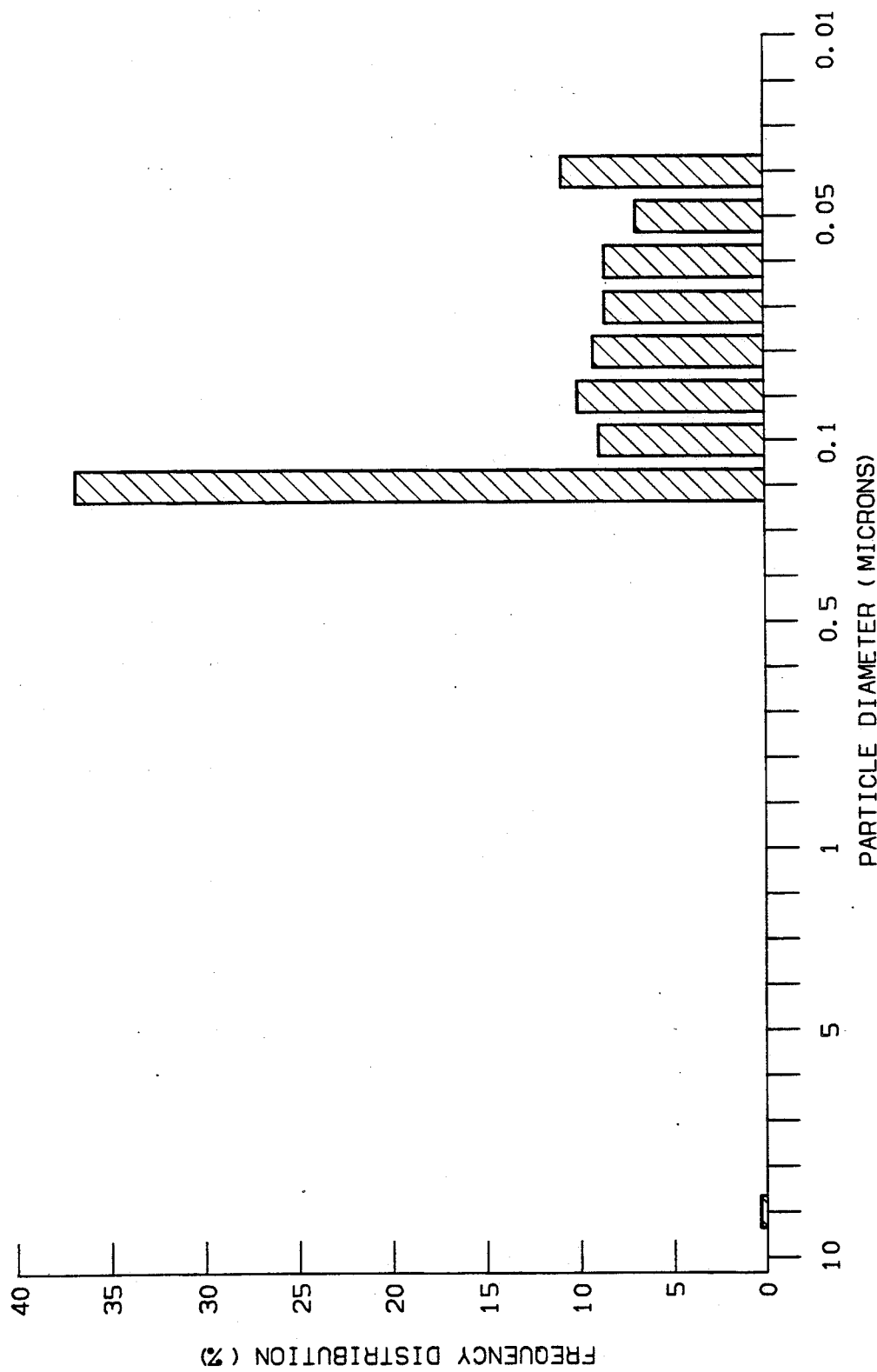
FIG. 8 is a graphical representation of the particle size distribution of a raw product as collected directly from the reactor in Example VI.

A sample of the raw product powder was analyzed in a Horiba CAPA-700 Particle Analyzer after the sample had been ultrasonically dispersed in a dispersant comprising equal parts of a 0.07 weight percent solution of Triton®X100 (Rohm & Haas Company) in deionized water and a 0.02 weight percent solution of sodium pyrophosphate in deionized water. The resulting particle size distribution was as follows wherein each percentage value is the weight percentage of particles examined falling in the particle diameter range indicated: 0.00 to 0.04 micron-10.5%, 0.04 to 0.05 micron-6.8%; 0.05 to 0.06 micron-8.5%; 0.06 to 0.07 micron-8.6%; 0.07 to 0.08 micron-9.1%; 0.08 to 0.09 micron-10.0%; 0.09 to 0.10 micron-8.9%; 0.10 to 0.20 micron-36.9%; 8 to 9 microns-0.7%. The last figure for the range of 8 to 9 microns is considered an anomaly in the data. These results are illustrated in the bar graph of FIG. 8 in which each bar represents one of the above-mentioned particle diameter ranges. Each bar is positioned at the particle diameter value which is the upper limit of a particular range. For example, the bar at 0.1 micron represents the 0.09 to 0.1 micron range.

The raw product powder was purified by placing a 1.81 gram sample of the powder in an open graphite crucible and heating it in an argon atmosphere at 1600° C. for 30 min., with heatup from room temperature to 1600° C. at a rate of 25° C./min. The temperature was increased to 1610° C. and held for 20 minutes and then cooled to room temperature in the argon atmosphere. Subsequently the sample was heated in an aluminum oxide crucible in air at 600° C. When the effluent gas showed a carbon monoxide level below 150 ppm the oxidation was terminated. Such purification steps serve to remove molecules characterized by silicon-oxygen bonds and also carbon from the raw product. The resulting purified product powder was light green in color.

Figure 9:
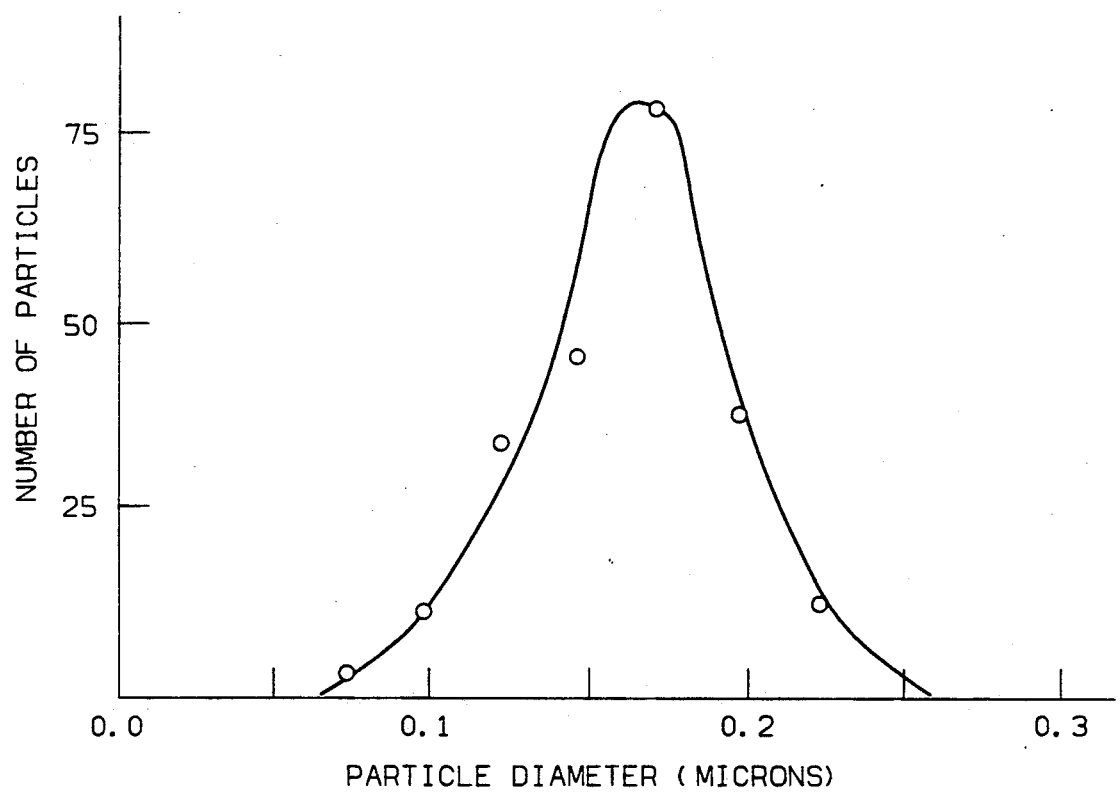
FIG. 9 is a graphical representation of the particle size distribution of a purified product produced in Example VI.

A sample of this product powder was viewed under a scanning electron microscope and a photograph taken with a size standard bar imposed on the photograph. The photograph was then manually analyzed by comparing the particle size of photographed particles with the standardized size bar imposed on the photograph. The particle size data presented in FIG. 9 is a plot of the particle diameter versus number of particles for the 218 examined particles.

EXAMPLE VII

The purpose of this example is to demonstrate the weight percentage ranges of carbon, silicon and oxygen in raw reactor product produced in accordance with previous examples.

TABLE VIIA

| Run | Range of Carbon in Product | |
|---|---|---|
| | Wt. % Carbon | Table |
| 22 | 19.0 | VC |
| 7 | 22.3 | IIB |
| 6 | 22.8 | IIB |
| 11 | 26.7 | IIIA |
| 10 | 26.8 | IIIA |
| 8 | 31.0 | IIB |
| 14 | 38.0 | IV |
| 13 | 38.1 | IV |

TABLE VIIB

| Run | Range of Silicon in Product | |
|---|---|---|
| | Wt. % Silicon | Table |
| 10 | 47.4 | IIIA |
| 11 | 56.2 | IIIA |
| 8 | 57.5 | IIB |
| 9 | 58.0 | IIB |
| 13 | 60.8 | IV |
| 7 | 60.9 | IIB |
| 6 | 61.6 | IIB |
| 14 | 63.1 | IV |
| 22 | 65.8 | VC |

TABLE VIIC

| Run | Range of Oxygen in Product | |
|---|---|---|
| | Wt. % Oxygen | Table |
| 14 | 1.2 | IV |
| 13 | 1.7 | IV |
| 9 | 9.9 | IIB |
| 8 | 15.6 | IIB |
| 11 | 15.0 | IIIA |
| 22 | 16.8 | VC |
| 6 | 22.3 | IIB |
| 7 | 24.3 | IIB |
| 10 | 25.6 | IIIA |

EXAMPLE VIII

The purpose of this example is to demonstrate that at least some silicon in product powder produced in accordance with the invention is simultaneously bonded to both carbon and oxygen.

A reactor as described in Example I was utilized to produce the product of this example. The oxygen flow rate was 0.61 gmol/min., and the fuel was $C_2H_4$ which flowed at a rate of 0.56 gmol/min. The combustion carbon to oxygen ratio was 0.92. The reactants employed were tetramethylsilane at 0.033 gmol/min. and ethylene at 0.052 gmol/min. The resulting raw product powder had the following composition: 21.2 wt. % carbon; 56.6 wt. % silicon; and 25.8 wt. % oxygen.

A sample of the resulting product was analyzed by silicon-29 nuclear magnetic resonance. The nuclear magnetic resonance spectrometer used was a model WPSY-200 available from Bruker Instruments. Since the materials examined were solids, the experimental determination utilized cross polarization magic angle spinning. The resulting spectral pattern, shown in FIG. 10, displays a large Si—O signal centered around −110 ppm and a silicon carbide signal near −15 ppm. The relaxation time of silicon carbide was measured and determined to be approximately 300 seconds. This requires a pulse delay of approximately 1000 seconds, meaning that a spectral scan can be made about once every 15 minutes. Since the spectral pattern is time averaged, to improve the signal to noise ratio, the number of scans required for time averaging in one twentyfour hour period does not exceed 100 scans. This results in a low signal to noise ratio.

Figure 10:
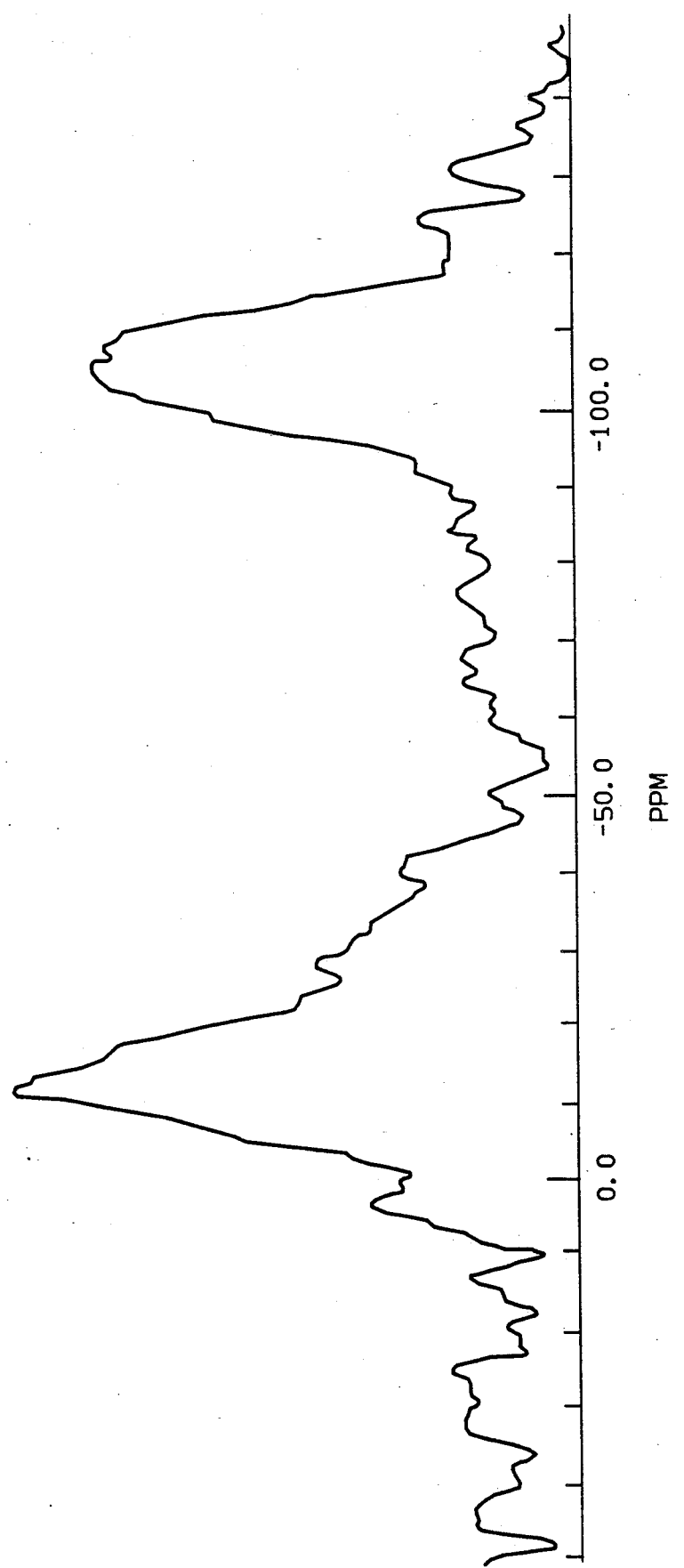
FIG. 10 is an NMR spectral pattern for a sample produced in Example VIII.

It should be noted in particular that the pattern of FIG. 10 shows some tailing of the silicon carbide signal toward higher field strength. This is taken to indicate a structure other than simple silicon-carbon bonds, namely simultaneous bonding of some of the silicon separately to both carbon and oxygen.

EXAMPLE IX

The purpose of this example is to demonstrate the lower level of impurities present in silicon carbide-containing product produced by the invention in comparison to commercially available materials.

A sample of product powder from run 13 of Example IV was subjected to a two step purification procedure substantially like that procedure described in Example VI. A sample of the resulting purified product was analyzed using X-ray fluorescence. This sample as well as a sample of commercially available silicon carbide whiskers were scanned for elemental impurities, where such impurities included aluminum and those elements of higher atomic numbers up to and including uranium. The comparison in Table IX is for the purified product in accordance with the invention and the commercially available silicon carbide whiskers. Only those contaminant elements are shown in Table IX which were detected for either the commercial whiskers or the purified product. All other elements were below detectable limits and are assumed to be zero for calculation of total impurities. As discussed previously, the strength of sintered ceramic parts is adversely affected by the presence of impurities. Therefore, a lower level of impurities can lead to greater strength parts produced from the purer product.

TABLE IX

X-Ray Fluorescence Determination of Impurities in Purified Final Product and Commercial Whiskers

| Element (in ppm) | Commercial Whiskers | Purified Final Product |
|---|---|---|
| Al | 1300 | 300 |
| P | 50 | 25 |
| Cl | ND* | 50 |
| Ca | 2300 | 20 |
| K | 50 | ND |
| Ba | 10 | ND |
| Ti | 5 | 2 |
| Mn | 1500 | ND |
| Cr | 70 | ND |
| Fe | 1000 | 100 |
| Zn | 50 | 30 |
| Pb | 20 | 50 |

*ND means not detected.

It can be seen from Table IX that the total levels of elemental impurities in the commercial product exceed that of the purified product of the invention.

EXAMPLE X

The purpose of the following example is to demonstrate that product produced in accordance with the invention may be sintered to at least 90% of theoretical density and that such sintering may be accomplished even when such product contains oxygen as an impurity. This example also demonstrates the use of propylene ($C_3H_6$) as the carbon-containing reactant and the use of a mixture ($C_2H_4, C_2H_2$) of carbon-containing reactants.

Densities obtained for various pressed and sintered parts discussed below were determined by either determining the volume of the part and weighting the part or using ASTM procedure C 373-72 which employs Archimedes principle and water.

A. Sintering of Raw Product: $Y_2O_3$ and $Al_2O_3$ Sintering Aids

The reactor described in Example V was used to prepare a quantity of reactor product under the conditions set forth below for further processing and sintering studies. Helium was passed as a purge gas at a flow rate of 0.15 gmol/min. through each sidestream reactant nozzle.

| Combustion C:O Ratio | Fuel Flow 80 vol. % $C_2H_4$ 20 vol. % $C_2H_2$ gmol/min. | Oxygen Flow gmol/min. | Sidestream Flows | | Product Analysis Wt. % Composition | | |
|---|---|---|---|---|---|---|---|
| | | | $SiH_4$ gmol/min. | $C_3H_6$ gmol/min. | C | Si | O |
| 1.04 | 1.12 | 1.09 | 0.06 | 0.11 | 33.6 | 59.5 | 7.8 |

The run produced 218 gms of product. The weight percentage for silicon was obtained by X-ray fluorescence analysis. X-ray powder diffraction analysis of the product revealed peaks at about 35°, 60° and 72°, definitely indicating beta silicon carbide.

15.47 g of the raw reactor product produced under the foregoing conditions was milled with 0.46 g yttrium oxide ($Y_2O_3$) and 0.16 g aluminum oxide ($Al_2O_3$) in the presence of 200 ml ethanol and 2 ml polyethylene glycol (Carbowax ® PEG 400, Union Carbide, Danbury, Conn.) for 4 hours in a high density polyethylene jar with nylon coated steel milling elements. The slurry was dried overnight to remove ethanol, crushed and screened through a number 40 sieve, and pressed at room temperature into a disc 3.34 cm in diameter, 0.155 cm thick, and weighing 1.25 gm using a Carver laboratory press and 70,000 lb force. At this point, the disc was determined to have a density of 0.92 g/cc or 29% of pure crystalline silicon carbide density, hereinafter referred to as "theoretical density". The disc was then sintered in a controlled atmosphere furnace by first evacuating the furnace to less than 200 millitorr and rapidly heating the sample from room temperature to 1000° C. in 15 min. At 1000° C. the temperature was increased to 1500° C. using a heating rate of 20° C./min and was held at 1500° C. for 30 minutes. The furnace was brought to atmospheric pressure using argon and the temperature was raised to 1800° C. using a heating rate of 10° C./min and subsequently raised to 2150° C. using a heating rate of 2° C./min. The sample was held at 2150° C. for 1 hour and then cooled to room temperature. The density of the disc was determined to be 2.92 g/cc or 91% of theoretical density. It is important to note that this high density disc was successfully sintered employing a raw reactor product with 7.8 wt. % oxygen without any oxygen removal steps prior to sintering and without applying any compaction force during sintering. It should also be noted that this high density disc was sintered from a pressed disc having a density of only 29% of theoretical density.

B. Sintering of Purified Product: $Y_2O_3$ and $Al_2O_3$ Sintering Aids 110 g of the raw reactor product as produced in part A. of this example was mixed with 11 g carbon black. 114.9 g of the resulting mixture was placed in a graphite box, and the box was placed in a controlled atmosphere furnace purged with argon. The furnace was heated to 1550° C. at 25° C./min. and held at 1550° C. for 2 hours. The resulting powder contained 36.7 wt. % C, 60.8 wt. % Si, and 1.38 wt. % O. Silicon weight percentage was obtained by X-ray fluorescence analysis. The powder was heated in air at 600° C. to remove free carbon to thereby produce a purified product powder.

A 14.90 g sample of this purified product was milled as in part A of this example using 0.33 g yttrium oxide, 0.33 g aluminum oxide, 60 ml ethanol, and 2 ml of polyethylene glycol (Carbowax ® PEG 400). After milling, drying, crushing, and sieving, a disc 1.245 cm in diameter and 0.137 cm thick was pressed to a density of 1.23 g/cc. After placing the disc in a furnace, the disc was sintered by raising the furnace temperature from room temperature to 1000° C. in 15 minutes, increasing the temperature to 1800° C. at a rate of 10° C./min., and then further heating up to 2200° C. at a rate of 2° C./min. Upon reaching 2200° C., the temperature was held at 2200° C. for 90 minutes followed by cooling to room temperature. This procedure produced a disc having a density of 3.08 g/cc, 96% of theoretical density.

C. Sintering of Raw Product: B Sintering Aid

Another batch (198 g) of raw product was produced using the same apparatus and procedure used in part A of this example. Analysis of the raw product yielded weight percentages as follows: 34.8 wt. % carbon; 57.0 weight % silicon, as obtained by X-ray fluorescence; and 9.0 wt. % oxygen. X-ray powder diffraction analysis revealed peaks at 35°, 60° and 72° indicative of the presence of silicon carbide.

10.55 g of the above product was added to 200 ml of a mixture comprising 48 wt. % ethanol and 52 wt. % heptane. This mixture was milled until the product powder was wet and formed a slurry. 0.1355 g of elemental boron (B), available from Callery Chemical Co., Callery, Pa., was added to the slurry and the resulting mixture was milled for 4 hours in a polyethylene jar with nylon coated steel milling elements. The solvent, comprising ethanol and heptane, was evaporated and the resulting dried cake was crushed and screened through a 40 mesh screen. A disc was pressed from the screened powder. The disc density was 0.887 g/cc which is 28% of theoretical density. After pressing, the disc was placed in a carbon element furnace and sintered using the following procedure. The furnace was first evacuated to less than 200 millitorr, and then heated from room temperature to 1000° C. in 15 minutes. The temperature was then further raised from 1000° C. to 1500° C., again over a period of 15 minutes. The 1500° C. temperature was held for 30 minutes, followed by pressurization of the furnace to 1 atmosphere with argon and further elevation of the temperature to 2100° C. in 15 minutes. The power to the furnace was then shut off and allowed to cool to room temperature. The resulting disc was determined to have a density of 2.84 g/cc, 88% of theoretical density, which was obtained employing a raw product with 9.0 wt. % oxygen without oxygen removal steps prior to sintering and without application of compaction force during sintering. It should also be noted that this high density disc was sintered from a pressed disc having a density of only 28% of theoretical density.

D. Sintering of Purified Product: B Sintering Aid

The reactor described in Example V was utilized to produce 275 g of raw product powder under the conditions set forth below. A flow of helium purge gas at a flow rate of 0.15 gmol/min per reactant nozzle was also employed in this run.

| Combustion C:O Ratio | Fuel Flow 80 vol. % $C_2H_4$ 20 vol. % $C_2H_2$ gmol/min | Oxygen Flow gmol/min | Sidestream Flows $SiH_4$ $C_2H_4$ $C_2H_2$ gmol/min | | | Product Analysis Wt. % Composition | | |
|---|---|---|---|---|---|---|---|---|
| | | | | | | C | Si | O |
| 1.04 | 1.12 | 1.09 | 0.059 | 0.052 | 0.072 | 32.8 | 69.4 | 10.1 |

The product was analyzed by X-ray powder diffraction and revealed peaks at about 35°, 60° and 72°, indicative of the presence of beta silicon carbide. 73 g of the powder obtained in the foregoing synthesis was placed in a graphite box purged with argon and the box placed in a controlled atmosphere furnace purged with nitrogen. The furnace was heated to 1550° C. and held at 1550° C. for 2 hours. The resulting powder contained 68.4 wt. % Si, 32.3 wt. % C, 1.2 wt. % O, and 1.1 wt. % N. The powder was heated in air at 600° C. until it turned a light green color.

The powder was subsequently washed with 12 wt. % aqueous hydrofluoric acid, rinsed several times with water and alcohol and vacuum dried.

23.8 g of the washed and vacuum dried product powder was mixed with 0.31 g elemental boron (Callery Chemical), 1.59 g phenolic resin, (Plyophen 23-169, BLT Corp., Warren, N.J.), 1.27 g polyethylene glycol (Carbowax ® PEG 400), and 100 ml acetone and milled for 15 hours. After milling, drying, crushing, and sieving, a disc 1.30 cm in diameter and 0.48 cm thick was pressed to a density of 1.97 g/cc, or 61% of theoretical density. After placing the disc in a controlled atmosphere furnace, the disc was sintered by evacuating the furnace to less than 200 millitorr and heating from room temperature to 1000° C. in 15 minutes. At 1000° C. the temperature was increased to 1550° C. at a rate of 40° C./min. whereupon the furnace was brought to atmospheric pressure using argon. Subsequently the furnace was heated to 2200° C. at a rate of 40° C./min and held at 2200° C. for 30 minutes, followed by cooling to room temperature. This produced a disc having a density of 3.10 g/cc, 97% of theoretical density.

E. Sintering of Raw Product: Introduction of B Sintering Aid in Synthesis

The reactor described in Example V was utilized to produce 60.2 g of raw product powder under the conditions set forth below. Note that a mixture (available from Alphagaz, Inc., Walnut Creek, Calif.) of 1.9 vol. % diborane ($B_2H_6$) and silane is employed rather than pure silane in order to introduce boron sintering aid into the raw product by means of the synthesis reaction. Helium was used as a purge gas through each reactant nozzle at a flow rate of 0.15 gmol/min.

| Combustion C:O Ratio | Fuel Flow 80 vol. % $C_2H_4$ 20 vol. % $C_2H_2$ gmol/min | Oxygen Flow gmol/min | Sidestream Flows | | Product Analysis Wt. % Composition | | |
|---|---|---|---|---|---|---|---|
| | | | $SiH_4 + B_2H_6$ gmol/min | $C_3H_6$ gmol/min | C | Si | O |
| 1.04 | 1.12 | 1.09 | 0.06 | 0.11 | 31.3 | 59.6 | 8.23 |

In the above product analysis results, the silicon weight percentage was obtained by X-ray fluorescence. The product was also analyzed for boron content via an inductively coupled plasma system. The measured mass ratio of B to Si was found to be 0.0091. An X-ray diffraction pattern of the product shows peaks at 35°, 60° and 72° which are clearly indicative of the presence of beta silicon carbide.

2.47 g of the above synthesized raw product was mixed with isopropanol, which was then subjected to about 100 watts of ultrasonic energy for 5 minutes using a Model W-380 Sonicator manufactured by Heat Systems Ultrasonics, Inc. of Farmingdale, N.Y. Another mixture of isopropanol and 0.12 g of carbon black (type FW18 from Degussa Corp., Teterboro, N.J.) was prepared using the same ultrasonic procedure. The two mixtures were then combined and subjected to the ultrasonic treatment again, followed by air drying on aluminum foil to remove the isopropanol. 2.5 g of the resulting dried material was added to more isopropanol and 0.27 g of oleic acid was also added. The mixture was then subjected to the above described ultrasonic procedure which produced a slurry which was dried on aluminum foil, crushed through a 40 mesh screen, and pressed at room temperature into a disc. The organic pressing aid, oleic acid, was burned out in accordance with the following procedure. The disc was placed on a graphite tray and inserted into a controlled atmosphere furnace which was heated to a temperature of 500° C. at a rate of 2° C./min. The temperature was then raised to 1000° C. at a rate of 5° C./min., and the 1000° C. temperature was maintained for 60 minutes. The resulting disc was 3.21 cm in diameter, 0.343 cm thick, and weighed 0.85 g giving a presintered density of 27% of theoretical density.

The disc was then sintered, without application of compaction force to the disc, using a high temperature furnace as follows: the furnace was evacuated to 200 millitorr; heated to a temperature of 1000° C. in 15 minutes; further elevated in temperature to 1450° C. at a rate of 20° C./min.; pressurized to 1 atmosphere with purified argon; heated from 1450° C. to 2100° C. at 60° C./min.; held at 2100° C. for 25 minutes; and finally cooled to room temperature. The resulting disc weighed 1.99 grams, was 2.08 cm in diameter and 0.208 cm thick. The density was determined to be about 2.8 g/cc or 88% of theoretical density.

That which is claimed is:

1. A method comprising the steps of:
providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;
establishing a flow of a combustible mixture in the combustion zone so as to flow in a direction generally toward the reaction zone, wherein the combustible mixture comprises a mixture of a fuel and an oxidant comprising oxygen;
combusting the combustible mixture in the combustion zone to produce hot combustion products;
injecting at least one reactant into said chamber at said boundary such that the hot combustion products carry said at least one reactant in the reaction zone generally toward said downstream end, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form a carbide compound;
whereby a product powder comprising the carbide compound is produced in the reaction zone.

2. A method as recited in claim 1 wherein said elemental molar ratio is in the range of about 0.9:1 to about 1.5:1.

3. A method as recited in claim 1 wherein said elemental molar ratio is in the range of about 1:1 to about 1.3:1.

4. A method as recited in claim 2 wherein the elemental molar ratio for the combustible mixture is at least about 0.7:1.

5. A method as recited in claim 3, wherein the elemental molar ratio for the combustible mixture is in the range of about 0.9:1 to about 1.1:1.

6. A method as recited in claim 5 wherein said temperature conditions are in the range of about 1400° C. to about 1700° C.

7. A method as recited in claim 1 wherein the fuel comprises a hydrocarbon selected from the group consisting of a cyclic hydrocarbon, an unsaturated hydrocarbon, and mixtures thereof.

8. A method as recited in claim 7 wherein said hydrocarbon is an unsaturated hydrocarbon and is selected from the group consisting of ethylene, propylene, butene, propadiene, butadiene, acetylene, propyne, butyne, and mixtures thereof.

9. A method as recited in claim 1 wherein said carbide compound is a compound of a first component and a second component, where the second component is carbon, said at least one reactant comprising a first reactant containing said first component, and also a second reactant containing said second component which react to form said carbide compound.

10. A method as recited in claim 9 wherein said first component is selected from the group consisting of silicon, boron, tungsten, chromuim, titanium, zirconium, molybdenum and iron.

11. A method as recited in claim 10 wherein said first component is silicon.

12. A method as recited in claim 11 wherein said first reactant is selected from the group consisting of silane, a substituted silane, and mixtures thereof.

13. A method as recited in claim 12 wherein said substituted silane is selected from the group consisting of an alkyl silane, an aryl silane, a halogenated methylsilane, a halogenated silane, a siloxane, a silazane, a silicon halide, and mixtures thereof.

14. A method as recited in claim 12 wherein said first reactant is silane.

15. A method as recited in claim 9 wherein said second reactant comprises a $C_1$-$C_9$ carbon compound.

16. A method as recited in claim 15 wherein said second reactant comprises a hydrocarbon.

17. A method as recited in claim 16 wherein said hydrocarbon is selected from the group consisting of methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof.

18. A method as recited in claim 1 wherein said carbide compound is a compound of a first component and a second component, where said second component is carbon and wherein said at least one reactant consists essentially of a single reactant containing said first component, said method further comprises injecting into said chamber in admixture with said at least one reactant a carrier gas selected from the group consisting of nitrogen, helium, argon, hydrogen, carbon monoxide, and mixtures thereof.

19. A method as recited in claim 1 wherein there is further provided a second tubular member which generally surrounds the first tubular member so as to define therebetween a first generally annular space through which said gas flows in said generally annular stream, said second tubular member having an inner sidewall and an outer sidewall which define a second generally annular space therebetween, said method further comprising flowing a coolant fluid through the second annular space during injection of said reactants.

20. A method as recited in claim 19 wherein there is also provided a second nozzle comprising a third tubular member having an outlet end which extends into the chamber and through which fuel and oxidant are injected into the chamber, the third tubular member comprising inner and outer walls which define therebetween a third annular space, said method further comprising flowing a coolant fluid through the third annular space.

21. A method as recited in claim 1 further comprising the step of passing the powder formed in the reaction zone from such zone and through a heat exchanger wherein the powder is cooled.

22. A method as recited in claim 21 further comprising the step of collecting the thus cooled powder.

23. A method as recited in claim 22 further comprising the steps of: heating the thus collected powder in an inert gas atmosphere within the temperature range of about 1300° C. to about 2400° C. for a time of at least about 15 minutes; and heating the thus collected powder in an oxygen-containing atmosphere within the temperature range of about 600° C. to about 900° C. for a time of at least about 15 minutes.

24. A method as recited in claim 23 wherein the thus collected powder is heated in the inert gas atmosphere at a temperature of about 1400° C. to about 1800° C. for a time of about 1 hour to about 2 hours and the thus collected powder is heated in the oxygen-containing atmosphere at a temperature of about 600° C. to about 700° C. for a time of about 30 minutes to about 2 hours.

25. A method as recited in claim 8 wherein said fuel comprises a mixture of ethylene and acetylene.

26. A method comprising the steps of:
providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;
establishing a flow of a combustible mixture in the combustion zone so as to flow in a direction generally toward the reaction zone, wherein the combustible mixture comprises a mixture of a fuel and an oxidant comprising oxygen;
combusting the combustible mixture in the combustion zone to produce hot combustion products;
injecting at least one reactant into the chamber at said boundary such that said at least one reactant is substantially gaseous as injected into the chamber and such that the hot combustion products carry said at least one reactant in the reaction zone generally toward said downstream end, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form a carbide compound;
whereby a product powder comprising the carbide compound is produced in the reaction zone.

27. A method comprising the steps of:
providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;
establishing a flow of a combustible mixture in the combustion zone so as to flow in a direction generally toward the reaction zone, wherein the combustible mixture comprises a mixture of a fuel and an oxidant;
combusting the combustible mixture in the combustion zone to produce hot combustion products;
injecting at least one reactant into the chamber at said boundary such that the hot combustion products carry said at least one reactant in the reaction zone generally toward said downstream end, wherein temperature conditions in at least a portion of the reaction zone are at least about 1400° C. and wherein the hot combustion products provide at least about 15% of the energy needed to maintain said temperature conditions and further wherein the elemental molar ratio of carbon to oxygen for the combination of the combustible mixture and said at least one reactant is at least about 0.8:1, said at least one reactant being capable of reacting in the reaction zone to form a carbide compound;

whereby a product powder comprising the carbide compound is produced in the reaction zone.

28. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone so as to flow in a direction generally toward the reaction zone, wherein the combustible mixture comprises a mixture of a fuel and an oxidant;

combusting the combustible mixture in the combustion zone to produce hot combustion products, wherein the fuel and oxidant are injected at a flow rate and the combustion zone is dimensioned such that there is substantially no free oxygen at the boundary;

injecting at least one reactant into said chamber at said boundary such that the hot combustion products carry said at least one reactant in the reaction zone generally toward said downstream end, wherein temperature conditions in at least a portion of the reaction zone are at least about 1400° C. wherein the elemental molar ratio of carbon to oxygen for the combination of the combustible mixture and said at least one reactant is at least about 0.8:1, said at least one reactant being capable of reacting in the reaction zone to form a carbide compound;

whereby a product powder comprising the carbide compound is produced in the reaction zone.

29. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone so as to flow in a direction generally toward the reaction zone, wherein the combustible mixture comprises a mixture of a fuel and an oxidant, and wherein the fuel and oxidant are injected into the chamber at a location closely adjacent to the upstream end of the chamber in a direction generally parallel to the longitudinal axis;

combusting the combustible mixture in the combustion zone to produce hot combustion products;

injecting at least one reactant into said chamber at said boundary in a direction generally perpendicular to the longitudinal axis such that the hot combustion products carry said at least one reactant in the reaction zone generally toward said downstream end, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form a carbide compound;

whereby a product powder comprising the carbide compound is produced in the reaction zone.

30. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

providing a first nozzle which comprises a first tubular member having an outlet end which extends into the chamber;

establishing a flow of a combustible mixture in the combustion zone so as to flow in a direction generally toward the reaction zone, wherein the combustible mixture comprises a mixture of a fuel and an oxidant;

combusting the combustible mixture in the combustion zone to produce hot combustion products;

injecting at least one reactant through the first tubular member and out the outlet end thereof into said chamber at said boundary such that the hot combustion products carry said at least one reactant in the reaction zone generally toward said downstream end, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form a carbide compound;

flowing a generally annular stream of a gas around the first tubular member in the direction of the outlet end of the first tubular member so as to flow into the chamber and so as to generally surround said at least one reactant in its flow from the outlet end;

whereby a product comprising the carbide compound is produced in the reaction zone and deposits on the first nozzle are substantially prevented.

31. A method comprising the steps of:

providing a reactor having a chamber defined therein which has a longitudinal axis and longitudinally separated upstream and downstream ends, wherein the chamber comprises a combustion zone and a reaction zone such that the combustion zone longitudinally extends from said upstream end to a boundary between the zones and such that the reaction zone longitudinally extends from said boundary to said downstream end;

establishing a flow of a combustible mixture in the combustion zone so as to flow in a direction generally toward the reaction zone, wherein the combustible mixture comprises a mixture of a fuel and an oxidant which is injected into the combustion zone and wherein the fuel and oxidant as injected is the only fuel and oxidant injected into the chamber;

combusting the combustible mixture in the combustion zone to produce hot combustion products;

injecting at least one reactant into the chamber at said boundary such that the hot combustion products carry said at least one reactant in the reaction zone generally toward said downstream end, wherein temperature conditions in at least a portion of the reaction zone are at least about 1400° C. and wherein the elemental molar ratio of carbon to oxygen for the combination of the combustible mixture and said at least one reactant is at least about 0.8:1, said at least one reactant being capable of reacting in the reaction zone to form a carbide compound;

whereby a product comprising the carbide compound is produced in the reaction zone.

* * * * *